US010923835B2

(12) United States Patent
Everett et al.

(10) Patent No.: US 10,923,835 B2
(45) Date of Patent: Feb. 16, 2021

(54) GROUNDING DEVICES, SYSTEMS, AND ASSOCIATED KITS AND METHODS

(71) Applicant: One Energy Enterprises LLC, Findlay, OH (US)

(72) Inventors: John Everett, Watertown, MA (US); Jereme Kent, Findlay, OH (US)

(73) Assignee: One Energy Enterprises LLC, Findlay, OH (US)

( * ) Notice: Subject to any disclaimer, the term of this patent is extended or adjusted under 35 U.S.C. 154(b) by 249 days.

(21) Appl. No.: 16/014,051

(22) Filed: Jun. 21, 2018

(65) Prior Publication Data

US 2018/0375231 A1  Dec. 27, 2018

Related U.S. Application Data

(60) Provisional application No. 62/523,299, filed on Jun. 22, 2017.

(51) Int. Cl.
| | |
|---|---|
| *H02H 9/08* | (2006.01) |
| *H01R 4/66* | (2006.01) |
| *H01R 11/14* | (2006.01) |
| *H02G 1/00* | (2006.01) |
| *H01R 13/648* | (2006.01) |

(52) U.S. Cl.
CPC ............... *H01R 4/66* (2013.01); *H01R 11/14* (2013.01); *H02G 1/00* (2013.01); *H02H 9/08* (2013.01); *H01R 13/648* (2013.01)

(58) Field of Classification Search
CPC ........ H01R 4/66; H01R 11/14; H01R 13/648; H02G 1/00; H02H 9/08
See application file for complete search history.

(56) References Cited

U.S. PATENT DOCUMENTS

| | | | |
|---|---|---|---|
| 3,235,696 A | 2/1966 | Mikulecky | |
| 3,534,993 A | 10/1970 | Le Vesque, Sr. | |
| 3,627,367 A | 12/1971 | Levy | |
| 3,739,452 A | 6/1973 | Gadberry | |
| 3,810,060 A | 5/1974 | Hubbard | |

(Continued)

OTHER PUBLICATIONS

Hubbell Power Systems, Inc. "Electro-Static Precipitator Grounding Tool Sets." Retreived from Internet Mar. 21, 2017.

(Continued)

*Primary Examiner* — Bryan R Perez
(74) *Attorney, Agent, or Firm* — MacMillan, Sobanski & Todd, LLC

(57) ABSTRACT

Grounding devices, systems, and associated methods and kits for grounding electrical equipment are described herein. An example embodiment of a grounding device includes a main body that has a main body first end, a main body second end, a main body top, a main body bottom, a main body first surface, a main body second surface, and defines a first passageway, a slot, and a track. The slot extends into the main body from the main body second end toward the main body first end to the track. The track has a track first end, a track second end, a track first portion, and a track second portion. The track first portion extends from the slot and away from the main body top. The track second portion extends from the track first portion, away from the main body first end and the main body top, to the track second end.

20 Claims, 10 Drawing Sheets

(56) References Cited

U.S. PATENT DOCUMENTS

| | | | |
|---|---|---|---|
| 3,863,145 | A | 1/1975 | Kelly et al. |
| 5,934,139 | A | 8/1999 | Tucker |
| 6,531,841 | B1 | 3/2003 | Elli et al. |
| 6,922,888 | B2 | 8/2005 | Barry et al. |
| 7,920,037 | B2 | 4/2011 | Lindsey et al. |
| 2002/0177352 | A1 | 11/2002 | Barry et al. |
| 2014/0176164 | A1* | 6/2014 | Davis ............... G01R 31/086 324/709 |
| 2016/0322286 | A1* | 11/2016 | Fujino ............... H01L 23/49568 |

OTHER PUBLICATIONS

Moloney Electric, "3-Phase Padmounted Transformers," www.moloneytx.com, 2009, pp. 1-4.

ERMCO, "Instruction Manual #103: Three Phase Pad Mount Distribution Transformer," www.ermco-eci.com, Mar. 2014, pp. 1-5.

ERMCO, "Cover Removal Instructions," Jan. 25, 2010, pp. 1-4.

Cooper Power Systems, "Functional Specification for Three-Phase Pad-Mounted Distribution Transformers 45-10,000 kVA," Distribution Transformers, Eaton, Aug. 2013, pp. 1-14.

Howard Industries, "Instructions (HI-105)," Distribution Transformer Division, Mar. 2012, pp. 1-36.

Eaton, "Pad-Mounted Transformers," www.eaton.com/consultants, Sep. 2011, pp. 1-14.

Cooper Power Systems, "Electrical Distribution Products for Commercial and Industrial Applications," www.cooperpower.com, Aug. 2005, pp. 1-20.

Cooper Power Systems, "Three-phase pad-mounted compartmental type transformer," Eaton, Aug. 2013, pp. 1-12.

Cooper Power Systems, "Three-phase pad-mounted compartmental type installation and maintenance instructions," Eaton, Aug. 2013, pp. 1-32.

Cooper Power Systems, "Two-Position Sidewall (Horizontal) and Cover (Vertical) Mounted Loadbreak Switches," OEM Equipment, Aug. 2012, pp. 1-8.

Cooper Power Systems, "External visible loadbreak option," Eaton, 2013, pp. 1-2.

Headlines@Hopkins, "Students' Device Aims to Protect Electric Utility Workers," News Release, Johns Hopkins University News Releases, accessed Nov. 5, 2014, pp. 1-4.

Advance Controls, Inc., Safety Switches—Top Entrance Rope Pull, ACIcontrols.com, accessed Nov. 4, 2014, pp. 1-2, http://www.acicontrols.com/catalog/product_detail.cfm/ID/255/Top-Entrance-Rope-Operated-Metal-Housing-Ordering-Info/.

* cited by examiner

GROUNDING DEVICES, SYSTEMS, AND ASSOCIATED KITS AND METHODS

RELATED APPLICATION

This application claims the benefit of U.S. Provisional Application No. 62/523,299, filed Jun. 22, 2017. This disclosure of this related application is hereby incorporated into this disclosure in its entirety.

FIELD

The disclosure relates generally to the field of electrical equipment. More particularly, the disclosure relates to grounding devices, systems, and associated kits and methods.

BACKGROUND

When working on high voltage electrical equipment, it is often necessary to de-energize the system before initiating work to provide a safe work environment. In some cases, this can be accomplished by opening the main switch on a transformer, such as a step down transformer. In these cases, the high side of the transformer will remain energized as it is connected to the grid and the low side will be de-energized. Alternatively, in cases in which a step up transformer is included as part of a distributed generation system, such as those connected to wind turbines or solar panels, the low side of the transformer will remain connected to a potential source of power and may pose a safety hazard if the source is inadvertently turned on. To protect against this safety hazard, each of the three phases of the low side of the transformer can be grounded. Currently, this is accomplished by connecting a clamp to a terminal of each of the three phases, which can be difficult to install while wearing cumbersome arc-flash rated personal protective equipment such as flame retardant clothing, heavy rubber gloves, and a face shield. In addition, these clamps are generally installed using a telescoping hot stick that is heavy and provides limited maneuverability and control.

A need exists, therefore, for improved devices, systems, kits, and methods for grounding electrical equipment.

BRIEF SUMMARY OF SELECTED EXAMPLE EMBODIMENTS

An example embodiment of a grounding device for grounding electrical equipment comprises a main body that has a main body first end, a main body second end, a main body top, a main body bottom, a main body first surface, a main body second surface, and defines a first passageway, a slot, and a track. The first passageway extends from the main body first surface to the main body second surface. The slot extends into the main body from the main body second end toward the main body first end to the track. The slot extends from the main body first surface to the main body second surface. The track has a track first end, a track second end, a track first portion, and a track second portion. The track is in communication with the slot, disposed between the first passageway and the main body second end, and extends from the main body first surface to the main body second surface. The track first portion extends from the slot and away from the main body top. The track second portion extends from the track first portion, away from the main body first end, and away from the main body top to the track second end.

An example kit comprises a grounding device for grounding electrical equipment, a first fastener, and a grounding cable. The grounding device comprises a main body that has a main body first end, a main body second end, a main body top, a main body bottom, a main body first surface, a main body second surface, and defines a first passageway, a slot, and a track. The first passageway extends from the main body first surface to the main body second surface. The slot extends into the main body from the main body second end toward the main body first end to the track. The slot extends from the main body first surface to the main body second surface. The track has a track first end, a track second end, a track first portion, and a track second portion. The track is in communication with the slot, disposed between the first passageway and the main body second end, and extends from the main body first surface to the main body second surface. The track first portion extends from the slot and away from the main body top. The track second portion extends from the track first portion, away from the main body first end, and away from the main body top to the track second end. The first fastener is sized and configured to be partially disposed within the first passageway. The grounding cable is sized and configured to be received with the slot and the track defined by the main body and moveable relative to the main body within the slot and the track.

An example method of installing a grounding system for grounding electrical equipment that has a terminal that has a first side, a second side, and defines a passageway comprises the steps of: obtaining a grounding system for grounding the electrical equipment, the grounding system comprises a main body and a first fastener, the main body has a main body first end, a main body second end, a main body top, a main body bottom, a main body first surface, a main body second surface, and defines a first passageway, a slot, and a track; positioning the main body on the first side of the terminal; passing a portion of the first fastener through the first passageway defined by the main body and the passageway defined by the terminal; and securing the first fastener to the main body and the terminal.

An example method of retrofitting a terminal of electrical equipment that is in service with a grounding system for grounding the electrical equipment comprises the steps of: opening doors to a cabinet; determining the current position of a handle of a switch of the electrical equipment; if manipulation of the handle is required, applying a force on the handle such that it moves from its original position to an altered position; determining whether the altered position of the handle has been achieved; detaching a portion of a first fastener from a terminal and a lug; removing a portion of the first fastener from the terminal and the lug; detaching a portion of a second fastener from the terminal and the lug; removing a portion of the second fastener from the terminal and the lug; positioning a main body of a grounding device on a first side of the terminal; positioning the lug on a second side of the terminal, the second side of the terminal is opposably facing the first side of the terminal; passing a portion of the first fastener through the lug, the terminal, and the main body; securing the first fastener to the lug, the terminal, and the main body; passing a portion of the second fastener through the lug, the terminal, and the main body; securing the second fastener to the lug, the terminal, and the main body; applying a force on the handle such that it moves from the altered position to its original position; and closing the doors to the cabinet.

An example method of grounding electrical equipment comprises the steps of: opening doors to a cabinet; applying a force on a grounding cable that is directed toward a grounding device that has a main body until the grounding cable is disposed within a slot defined by the main body; applying a force on the grounding cable directed toward a track defined by the main body until the grounding cable is disposed within the track; applying a force on the grounding cable directed toward the track second end until the grounding cable is disposed adjacent to a track second end; confirming placement of the grounding cable relative to the main body; performing work; applying force on the grounding cable directed away from a main body bottom until the grounding cable is disposed adjacent the slot defined by the main body; applying force on the grounding cable directed away from the main body until the grounding cable is free of the main body; and closing the doors to the cabinet.

Additional understanding of the example grounding devices, grounding systems for grounding electrical equipment, kits that include a grounding system, methods of installing a grounding system, methods of retrofitting a terminal of electrical equipment with a grounding system, and methods of grounding electrical equipment can be obtained by review of the detailed description, below, and the appended drawings.

DETAILED DESCRIPTION

The following detailed description and the appended drawings describe and illustrate various example embodiments of grounding devices, grounding systems for grounding electrical equipment, kits that include a grounding system, methods of installing a grounding system, methods of retrofitting a terminal of electrical equipment with a grounding system, and methods of grounding electrical equipment. The description and illustration of these examples are provided to enable one skilled in the art to make and use a grounding device, a grounding system, a kit that includes a grounding system, to practice a method of installing a grounding system, to practice a method of retrofitting a terminal of electrical equipment with a grounding system, and to practice a method of grounding electrical equipment. They are not intended to limit the scope of the claims in any manner.

As used herein, the phrase "electrical equipment" refers to any device, or portion of a system, that uses, transfers, transforms, or generates energy, such as a transformer, an electric switchboard, a distribution board, or a meter.

Figure 1:
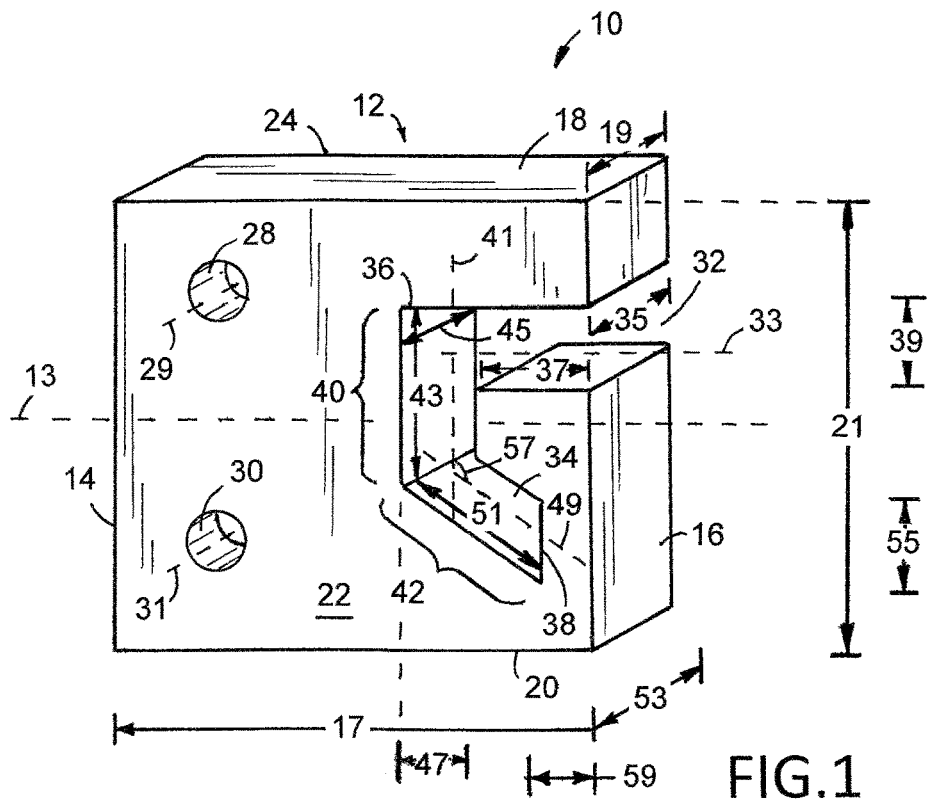
FIG. 1 is a perspective view of an example grounding device.

FIG. 1 illustrates an example grounding device 10 useful for grounding electrical equipment. The grounding device 10 includes a main body 12 that has a main body lengthwise axis 13, a main body first end 14, a main body second end 16, a main body length 17, a main body top 18, a main body width 19, a main body bottom 20, a main body height 21, a main body first surface 22, a main body second surface 24, and defines a first passageway 28, a second passageway 30, a slot 32, and a track 34. The main body lengthwise axis 13 extends through the main body first end 14 and the main body second end 16 and is centrally located between the main body top 18 and the main body bottom 20. The main body length 17 is measured along the main body lengthwise axis 13 and extends from the main body first end 14 to the main body second end 16. The main body width 19 is measured along an axis that is disposed orthogonal to the main body lengthwise axis 13 and from the main body first surface 22 to the main body second surface 24. The main body height 21 is measured along an axis that is disposed orthogonal to the main body lengthwise axis 13 from the main body top 18 to the main body bottom 20.

Each of the first passageway 28 and the second passageway 30 extends from the main body first surface 22 to the main body second surface 24 and is sized and configured to receive a portion of a fastener, as described in more detail herein. Each of the first passageway 28 and the second passageway 30 is disposed between the main body first end 14 and the track 34. The first passageway 28 has a first passageway central axis 29 and the second passageway 30 has a second passageway central axis 31. In the illustrated embodiment, each of the first passageway central axis 29 and second passageway central axis 31 intersect an axis that is disposed orthogonal to the main body lengthwise axis 13. Each of first passageway 28 and second passageway 30 is disposed a first distance from the main body first end 14 and a second distance from the main body second end 16 that is greater than the first distance.

In the illustrated embodiment, the slot 32 has a slot lengthwise axis 33, a slot width 35, a slot length 37, a slot height 39, and extends into the main body 12 from the main body second end 16 and toward the main body first end 14 to the track 34. The slot 32 extends from the main body first surface 22 to the main body second surface 24. The slot 32 is sized and configured to receive a portion of a grounding cable, as described in more detail herein. The slot lengthwise axis 33 is parallel to the main body lengthwise axis 13 and is centrally located through the slot 32 at the main body second end 16 and the slot 32 at the junction between the slot 32 and the track 34. The slot width 35 is measured along an axis that is orthogonal to the slot lengthwise axis 33 and the slot length 37 is measured along the slot lengthwise axis 33. The slot width 35 is less than one half of the main body length 17. The slot length 37 is less than one half of the main body length 17. The slot height 39 is measured along an axis that is disposed orthogonal to the slot lengthwise axis 33 and is less than one quarter of the main body length 17. The slot 32 is positioned such that a first distance is disposed between the slot 32 and the main body top 18 and a second distance is disposed between the slot 32 and the main body bottom 20 that is greater than the first distance.

In the illustrated embodiment, the track 34 has a track first end 36, a track second end 38, a track first portion 40, and a track second portion 42. The track 34 is disposed between the first and second passageways 28, 30 and the main body second end 16 and is sized and configured to receive a portion of a grounding cable, as described in more detail herein. The track 34 extends from the main body first surface 22 to the main body second surface 24. The track first portion 40 has a track first portion lengthwise axis 41, a track first portion length 43, a track first portion width 45, a track first portion height 47, and extends from the track first end 36 and away from the main body top 18 along the track first portion lengthwise axis 41. The track 34 (e.g., a portion of the track 34 that extends from the track first end 36 toward the track second end) is in communication with the slot 32 such that structure (e.g., grounding cable) can be passed through the slot 32 and into the track 34. The track first portion lengthwise axis 41 is disposed orthogonal to the main body lengthwise axis 13 and the slot lengthwise axis 33 and is centrally located through the track first end 36 and centrally located within the track 34 at the junction between the track first portion 40 and the track second portion 42. The track first portion length 43 is measured along the track first portion lengthwise axis 41 and is greater than the slot length 37 and less than the main body length 17. The track first portion width 45 is measured along an axis that is disposed orthogonal to the track first portion lengthwise axis 41 and from the main body first surface 22 to the main body second surface 24. The track first portion width 45 is equal to the slot width 35. The track first portion height 47 is measured on an axis that is disposed orthogonal to the track first portion lengthwise axis 41 and parallel to the main body lengthwise axis 13. The track first portion height 47 is less than the main body length 17 and is equal to the slot height 39.

In the illustrated embodiment, the track second portion 42 has a track second portion lengthwise axis 49, a track second portion length 51, a track second portion width 53, a track second portion height 55, and extends from the track first portion 40, away from the main body first end 14, and away from the main body top 18 to the track second end 38 along the track second portion lengthwise axis 43. The track second portion 42 is in communication with the track first portion 40 such that structure (e.g., grounding cable) can be passed through the track first portion 40 and into the track second portion 42. The track second portion lengthwise axis 49 is disposed at an angle 57 relative to the first portion lengthwise axis 41 and is centrally located through the junction between the track first portion 40 and the track second portion 42 and centrally located through the track second end 38. The angle 57 is greater than 90 degrees. The track second portion length 51 is measured along the track second portion lengthwise axis 49 and is less than the track first portion length 43. The track second portion width 53 is measured along an axis that is disposed orthogonal to the track second portion lengthwise axis 49 and from the main body first surface 22 to the main body second surface 24. The track second portion width 53 is equal to the slot width 35. The track second portion height 55 is measured along an axis that is disposed at an angle to the track second portion lengthwise axis 49. The track second portion height 55 is less than the main body length 17 and is equal to the slot height 39. In the illustrated embodiment, the track second end 38 is disposed a distance 59 from the main body second end 16 that is less than the slot length 37. It is considered advantageous for a slot height, a track first portion height, and a track second portion height to be slightly larger, equal to, slightly less than, or about, the diameter of a grounding cable at least because this configuration maximizes the contact between the grounding cable and the grounding device and the electrical conductivity between the grounding cable and the grounding device during use.

The configurations of the slots and tracks described herein are considered advantageous at least because they provide a mechanism for advancing a grounding cable through a slot and into a track such that the electrical equipment to which the grounding device is intended to be attached can be grounded. In addition, the configurations of the slots and tracks described herein prevent a grounding cable from bouncing out of a track during use should a fault occur and provide a grounding device that can be installed on electrical equipment such that interference with other components of the equipment can be avoided (e.g., main body minimally projects from the component to which it is intended to be attached). Furthermore, the configurations of the slots and tracks described herein are considered advantageous at least because they provide a mechanism for grounding electrical equipment without using a clamp, which can be difficult to attach to the electrical equipment.

A main body of a grounding device can be formed of any suitable conductive material and selection of a suitable conductive material to form a main body can be based on various considerations, including the material that forms the component to which a main body is intended to be attached. Examples of conductive materials considered suitable to form a main body include metals such as stainless steel, copper, conductive materials, conductive metal alloys, materials that have a rectangular, elongated, or square, cross-sectional configuration, materials that have a first cross-sectional configuration along a first portion of its length (e.g., rectangular) and a second cross-sectional configuration along a second portion of its length (e.g., square), combinations of the materials described herein, and any other conductive material considered suitable for a particular embodiment. In the illustrated embodiment, the main body 12 is formed of a conductive material, such as copper.

While the main body 12 has been illustrated as having a plate structural configuration (e.g., cuboidal structural arrangement), a main body can have any suitable structural arrangement and selection of a suitable structural arrangement for a main body can be based on various considerations, including the intended use of the grounding device. Examples of structural arrangements considered suitable for a main body of a grounding device include cubes, cuboids, cylinders, partial cylinders, triangular prisms, prisms having any suitable number of surfaces and edges, and any other structural arrangement considered suitable for a particular embodiment.

While the main body 12 has been illustrated as defining first and second passageways 28, 30 and such that each of the first passageway central axis 29 and the second passageway central axis 31 intersects an axis that is disposed orthogonal to the main body lengthwise axis 13, a main body can define any suitable number of passageways and each passageway defined by the main body can be positioned at any suitable location on a main body. Selection of a suitable number of passageways for a main body to define and of suitable positions to locate each passageway can be based on various considerations, including the structural arrangement of the component to which a main body is intended to be attached. Examples of numbers of passageways considered suitable for a main body to define include one, at least one, two, a plurality, three, four, five, more than five, and any other number considered suitable for a particular embodiment. Examples of locations considered suitable to position a passageway, or a plurality of passageways, defined by a main body include between a main body first end and a track, between a main body first end and a main body second end, adjacent to a track, adjacent to a slot, between a main body top and a slot, between a main body top and a track, between a main body bottom and a slot, between a main body bottom and a track, such that a first passageway central axis and a second passageway central axis intersect an axis that is disposed at an angle, orthogonal, or parallel, to the main body lengthwise axis (e.g., the first and second passageways are not vertically aligned), and any other location considered suitable for a particular embodiment.

While the slot 32 has been illustrated as extending into the main body 12 from the main body second end 16 and toward the main body first end 14 to the track 34 such that the slot lengthwise axis 33 is parallel to the main body lengthwise axis 13, a slot can extend from any suitable portion of a main body and at any suitable angle relative to a main body lengthwise axis. Selection of a suitable portion of a main body for a slot to extend and of a suitable angle to position a slot lengthwise axis relative to a main body lengthwise can be based on various considerations, including the size and configuration of a grounding cable intended to be passed through a slot. Examples of suitable portions of a main body from which a slot can extend include a main body second end, a main body top, a main body bottom, and any other portion of a main body considered suitable for a particular embodiment. Examples of suitable angles considered suitable for a slot lengthwise axis to be disposed relative to a main body lengthwise axis include acute angles, obtuse angles, such that the slot lengthwise axis is parallel to a main body lengthwise axis, and any other angle considered suitable for a particular embodiment.

While the track 34 has been illustrated as having first and second portions 40, 42, as having a track first portion lengthwise axis 41 disposed at an angle relative to the slot lengthwise axis 33, and as having a track second portion lengthwise axis 49 disposed at an angle 57 relative to the track first portion lengthwise axis 41, a track can have any suitable number of portions positioned at any suitable angle relative to another portion of a track and/or slot. Selection of a suitable number of portions to include on a track and of suitable angles to position each portion relative to another portion of a track and/or a slot can be based on various considerations, including the size and configuration of a grounding cable intended to be passed into a slot and/or track. Examples of suitable numbers of portions to include on a track include one, at least one, two, a plurality, three, four, five, more than five, and any other number considered suitable for a particular embodiment. Examples of angles considered suitable to position a track first portion relative to a track second portion, or any other portion of a track and/or slot, include acute angles, obtuse angles, and any other angle considered suitable for a particular embodiment. For example, a track first portion lengthwise axis can be disposed at a first angle relative to a slot lengthwise axis and a track second portion lengthwise axis can be disposed at a second angle relative to the track first portion lengthwise axis that is greater than, less than, equal to, or about the first angle.

While the slot 32 and the track 34 have been illustrated as linear such that the surfaces that define the slot 32 and the track 34 have linear continuous surfaces, a slot and any portion of a track defined by a main body can have any suitable structural arrangement. Selection of a suitable structural arrangement for a slot and/or a track can be based on various considerations, including the structural arrangement of a grounding cable intended to passed into the slot and/or track. Examples of structural arrangements considered suitable for the surfaces that define a slot and/or track defined by a main body include linear, curved, sinusoidal, arrangements that have a radius of curvature, continuous, non-interrupted, interrupted, combinations of the structural arrangements described herein, and any other structural arrangement considered suitable for a particular embodiment.

Figure 2:
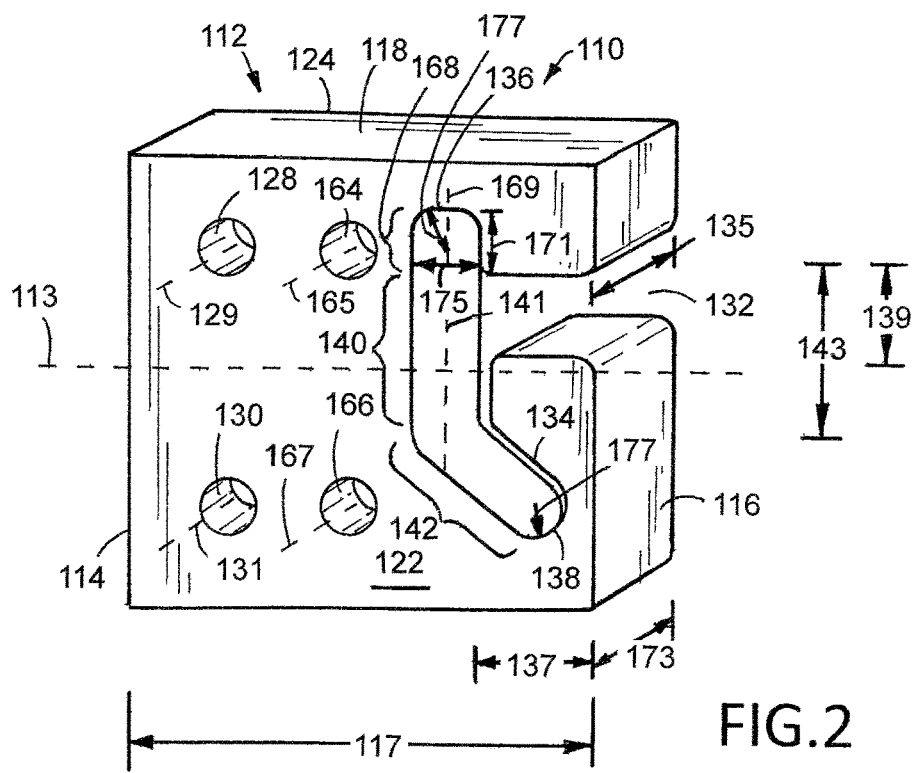
FIG. 2 is a perspective view of another example grounding device.

FIG. 2 illustrates another example grounding device 110. The grounding device 110 is similar to the grounding device 10 illustrated in FIG. 1 and described above, except as detailed below. In the illustrated embodiment, the main body 112 defines a first passageway 128, a second passageway 130, a third passageway 164, a fourth passageway 166, a slot 132, and a track 134.

In the illustrated embodiment, each of the first passageway 128, the second passageway 130, the third passageway 164, and the fourth passageway 166 extends from the main body first surface 122 to the main body second surface 124 and is sized and configured to receive a portion of a fastener, as described in more detail herein. Each of the first passageway 128, the second passageway 130, the third passageway 164, and the fourth passageway 166 is disposed between the main body first end 114 and the track 134. The first passageway 128 has a first passageway central axis 129, the second passageway 130 has a second passageway central axis 131, the third passageway 164 has a third passageway central axis 165, and the fourth passageway 166 has a fourth passageway central axis 167. Each of the first passageway central axis 129 and second passageway central axis 131 intersects an axis that is disposed orthogonal to the main body lengthwise axis 113. Each of the third passageway central axis 165 and fourth passageway central axis 167 intersects an axis that is disposed orthogonal to the main body lengthwise axis 113. Each of first passageway 128 and the second passageway 130 is disposed a first distance from the main body first end 114 and a second distance from the main body second end 116 that is greater than the first distance. Each of the third passageway 164 and the fourth passageway 166 is disposed a third distance from the main body first end 114 and a fourth distance from the main body second end 116 that is greater than the third distance.

In the illustrated embodiment, the track 134 has a first portion 140, a second portion 142, and a third portion 168. The third portion 168 has a track third portion lengthwise axis 169, a track third portion length 171, a track third portion width 173, a track third portion height 175, and extends from the track first end 136, away from the main body top 118, to the track first portion 140 along the third portion lengthwise axis 169. The track third portion 168 extends from the track first end 136 to the track first portion 140. The track 134 is in communication with the slot 132 such that structure (e.g., grounding cable) can be passed through the slot 132 and into the track 134. The track third portion lengthwise axis 169 is disposed orthogonal to the main body lengthwise axis 113 and is centrally located through the track first end 136 and centrally located within the track 134 at the junction between the track first portion 140 and the track third portion 168. The track first portion lengthwise axis 141 is disposed orthogonal to the main body lengthwise axis 113 and is centrally located through the junction between the track first portion 140 and the track third portion 168 and centrally located within the track 134 at the junction between the track first portion 140 and the track second portion 142. The track third portion length 171 is measured along the track third portion lengthwise axis 169 and is less than the track first portion length 143 and less than the slot length 137. The track third portion width 173 is measured along an axis that is disposed orthogonal to the track third portion lengthwise axis 169 and from the main body first surface 122 to the main body second surface 124 and is equal to the slot width 135. The track third portion height 175 is measured orthogonal to the track third portion lengthwise axis 169 and is less than the main body length 117 and is equal to the slot height 139. It is considered advantageous for a slot height, a track first portion height, a track second portion height, and a track third portion height to be slightly larger, equal to, slightly less than, or about, the diameter of a grounding cable at least because this configuration maximizes the contact between the grounding cable and the grounding device and the electrical conductivity between the grounding cable and the grounding device during use.

In the illustrated embodiment, the intersections between the main body second end 116 and the portion of the main body 112 that defines the slot 132 are curved, the intersections between the portion of the main body 112 that defines the slot 132 and the track 134 are curved, and each of the track first end 136 and the track second end 138 has a radius of curvature 177. This structural arrangement is considered advantageous at least because it provides a mechanism for passing a grounding cable into the slot 132 and track 134 without having to navigate around corners (e.g., straight edges) and provides a mechanism for increasing the surface area of a grounding cable that contacts the main body 112 during use (e.g., at the track second end 138). For example, the radius of curvature of a track first end and/or a track second end can be equal to, greater than, slightly larger, slightly less than, or about, the radius of curvature of a grounding cable that is intended to be used with a grounding device.

While the track third portion 168 has been illustrated as having a track third portion lengthwise axis 169 disposed at an angle relative to the main body lengthwise axis 113, a track third portion lengthwise axis can be positioned at any suitable angle relative to another portion of a track and/or slot. Selection of a suitable angle to position each portion of a track relative to another portion of a track and/or a slot can be based on various considerations, including the size and configuration of a grounding cable intended to be passed into a track. Examples of angles considered suitable to position a track third portion relative to a track first portion, or any other portion of a track and/or slot, include acute angles, obtuse angles, and any other angle considered suitable for a particular embodiment.

While the intersections between the main body second end 116 and the portion of the main body 112 that defines the slot 132 have been illustrated as curved and the intersections between the portion of the main body 112 that defines the slot 132 and the track 134 have been illustrated as curved, these intersections can have any suitable structural arrangement. Selection of a suitable structural arrangement for an intersection between a main body second end and a portion of a main body that defines a slot and an intersection between a portion of a main body that defines a slot and a track can be based on various considerations, including the structural arrangement of a grounding cable intended to be passed into a slot and/or track. Examples of structural arrangements considered suitable for an intersection between a main body second end and a portion of a main body that defines a slot and an intersection between a portion of a main body that defines a slot and a track include those that are curved, define an edge, such as a straight edge, a beveled edge, and any other structural arrangement considered suitable for a particular embodiment.

While the track first end 136 and the track second end 138 have been illustrated as having a radius of curvature 177, a track first end and a track second end can have any suitable structural arrangement and selection of a suitable structural arrangement can be based on various considerations, including the intended use of the grounding device. Examples of structural arrangements considered suitable for a track first end and/or a track second end include those that have a radius of curvature, define a shape that mirrors the shape of a grounding cable intended to be used with the grounding device, and any other arrangement considered suitable for a particular embodiment.

Figure 2A:
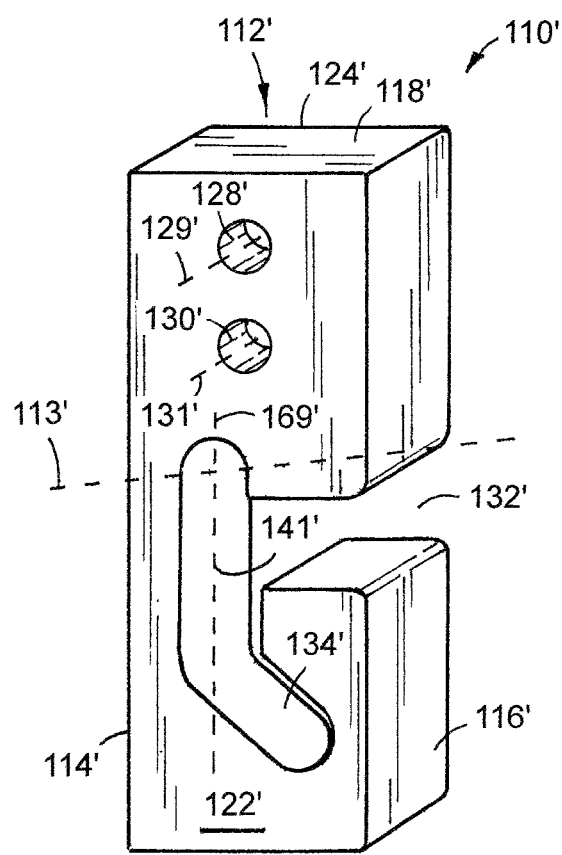
FIG. 2A is a perspective view of another example grounding device.
Figure 3:
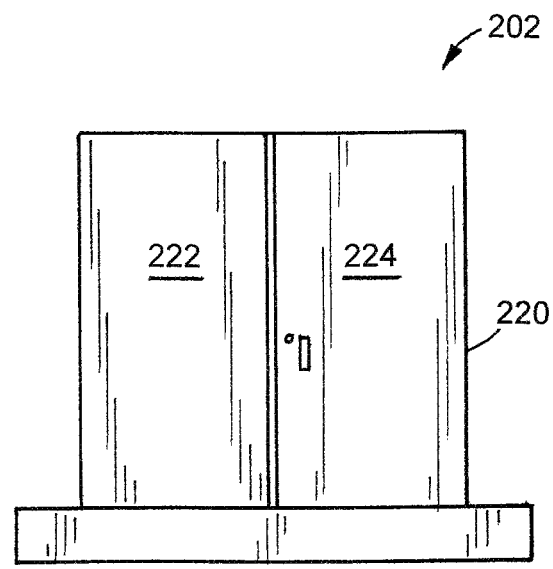
FIG. 3 is an elevation view of a cabinet that houses electrical equipment, a plurality of terminals, and an example embodiment of a grounding system for grounding the electrical equipment.

FIG. 2A illustrates another example grounding device 110'. The grounding device 110' is similar to the grounding device 110 illustrated in FIG. 2 and described above, except as detailed below. In the illustrated embodiment, the main body 112' defines a first passageway 128', a second passageway 130', a slot 132', and a track 134'.

In the illustrated embodiment, each of the first passageway 128' and the second passageway 130' extends from the main body first surface 122' to the main body second surface 124' and is sized and configured to receive a portion of a fastener, as described in more detail herein. Each of the first passageway 128' and the second passageway 130' is disposed between the main body first end 114' and the main body second end 116' and between the main body top 118' and the track 134'. The first passageway 128' has a first passageway central axis 129' and the second passageway 130' has a second passageway central axis 131'. Each of the first passageway central axis 129' and second passageway central axis 131' intersects an axis that is disposed orthogonal to the main body lengthwise axis 113' and that is coaxial with the track first portion lengthwise axis 141' and the track third portion lengthwise axis 169'. Each of first passageway 128' and the second passageway 130' is disposed a first distance from the main body first end 114' and a second distance from the main body second end 116' that is equal to the first distance. Alternative embodiments, however, can include a first passageway and a second passageway that are each disposed a first distance from a main body first end and a second distance from a main body second end that is greater than, or less than, the first distance, that have a central axis that intersects an axis that is disposed at an angle relative to a main body lengthwise axis, that have a central axis that intersects an axis that is coaxial with one of a track first portion lengthwise axis or a track third portion lengthwise axis, and/or that have a central axis that intersects an axis that is coaxial with neither of a track first portion lengthwise axis or a track third portion lengthwise axis. The structural arrangement of the grounding device illustrated in FIG. 2A is considered advantageous at least because it can be utilized in instances in which small distances between a closed door of a cabinet and a terminal prevent any structures from being attached to the terminal that project from the terminal and toward the door and/or in instances in which the passageways defined by a terminal closest to a closed cabinet door are free of any lugs.

FIGS. 3, 4, 5, and 6 illustrate a cabinet 202 that houses electrical equipment 204, a plurality of terminals 206, a plurality of lugs 208, and an example embodiment of a grounding system 210 for grounding the electrical equipment. In the illustrated embodiment, the grounding system 210 is disposed within the cabinet 202 and comprises the grounding device 110, as shown in FIG. 2, a first fastener 214, and a second fastener 216.

While grounding system 210 has been illustrated as including the grounding device 110 illustrated in FIG. 2, a grounding system for grounding electrical equipment can include any suitable grounding device according to an embodiment described herein. Examples of grounding devices considered suitable to include in a grounding system include grounding device 10, grounding device 110, grounding device 110', variations of the grounding devices described herein, and any other grounding device considered suitable for a particular embodiment. A grounding system can be attached to any suitable type of electrical equipment and selection of suitable electrical equipment to attach a grounding system can be based on various considerations, including the intended use of a grounding system and/or the structural arrangement of the electrical equipment. In the illustrated embodiment, the electrical equipment 204 is a transformer 205.

Figure 4:
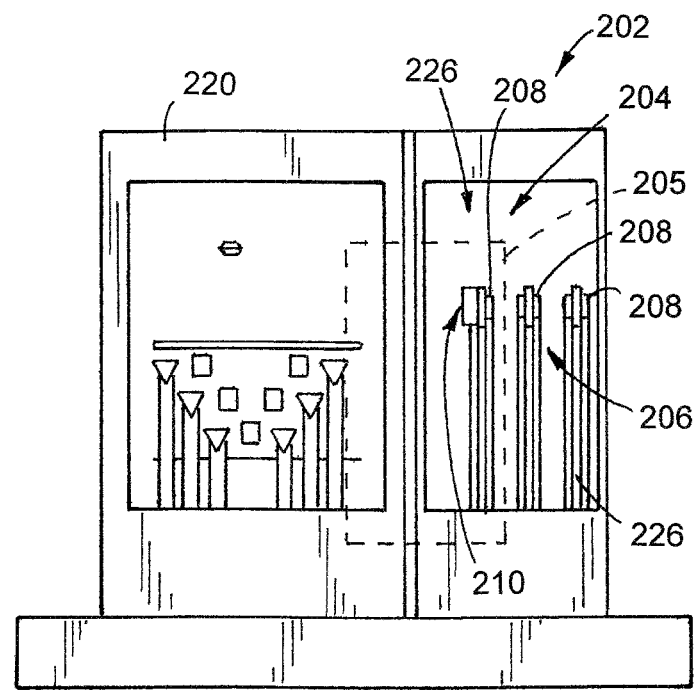
FIG. 4 is an elevation view of the cabinet illustrated in FIG. 3 with its doors removed to show the components of the grounding system for grounding the electrical equipment relative to the cabinet. The grounding system includes the grounding device illustrated in FIG. 2 attached to a terminal of the plurality of terminals.
Figure 5:
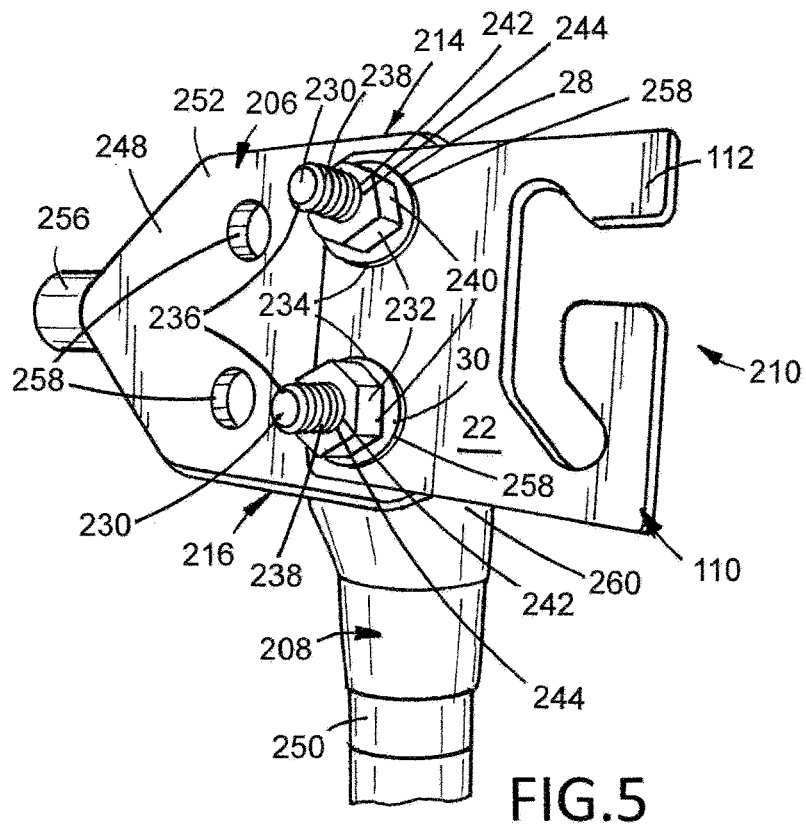
FIG. 5 is a perspective view of the grounding system illustrated in FIG. 4 attached to the terminal. The terminal is free of the cabinet.
Figure 6:
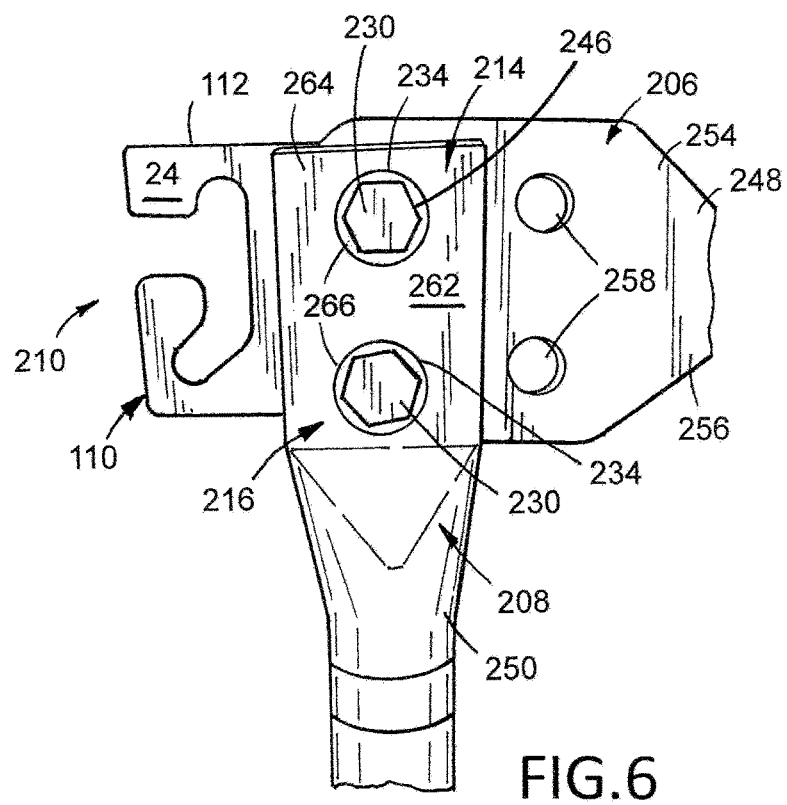
FIG. 6 is another perspective view of the grounding system and terminal illustrated in FIG. 5.

In the illustrated embodiment, the cabinet 202 comprises a body 220, a first door 222, and a second door 224. The body 220, the first door 222, and the second door 224 cooperatively define a chamber 226 that houses the transformer 204, the plurality of terminals 206, the plurality of lugs 208, and the grounding system 210. In the illustrated embodiment, each terminal of the plurality of terminals 206 is attached to the body 220 of the cabinet 202 and is in communication with the transformer 205. As shown in FIG. 4, each lug of the plurality of lugs 208 is attached to an electrical cable 226 and is attached to a terminal of the plurality of terminals 206 such that each lug of the plurality of lugs 208 is in communication with the transformer 205. As shown in FIGS. 5 and 6, the grounding device 10 is releasably attached to a terminal of the plurality of terminals 206 such that the portion of the transformer 205 to which the terminal is attached can be grounded, as described in more detail herein.

Each of the first fastener 214 and second fastener 216 is adapted to provide releasable attachment between the main body 12, a terminal of the plurality of terminals 206, and a lug of the plurality of lugs 208. Any suitable fastener capable of providing releasable attachment between a main body, a terminal, and/or a lug can be included in the grounding systems described herein. Example fasteners considered suitable to include in a grounding system include snap-fit fasteners, clevis pins, cotter pins, threaded members, such as bolts, U-bolts, screws, nuts, wingnuts, clamps, and any other fastener considered suitable for a particular embodiment.

As shown in FIGS. 5 and 6, an example of a suitable first fastener 214 and a suitable second fastener 216 is a bolt 230, a nut 232, and a plurality of washers 234. As shown in FIG. 5, each bolt 230 has a main body 236 that defines external threads 238 along a portion of its length and each nut 232 has a main body 240 that defines a passageway 242 and internal threads 244 that extend into the passageway 242. A portion of each bolt 230 is sized and configured to be received by the passageway 242 defined by a nut 232 such that the external threads 238 of the bolt 230 mate with the internal threads 244 of the nut 232. Each washer of the plurality of washers 234 defines a passageway 246 that is sized and configured to receive a portion of a bolt 230.

As shown in FIGS. 5 and 6, the main body 112 is attached to a terminal 248 of the plurality of terminals 206 and a lug 250 of the plurality of lugs 208. The terminal 248 has a first side 252, a second side 254, and a main body 256 that defines a plurality of passageways 258. The lug 250 has a first side 260, a second side 262, and a main body 264 that defines a plurality of passageways 266. The main body 12 is attached to the first side 252 of the terminal 248 such that the main body second surface 24 contacts the first side 252 of the terminal 248. The lug 250 is attached to the second side 254 of the terminal 248 such that the first side 260 of the lug 250 contacts the second side 254 of the terminal 248. The bolt 230 of the first fastener 214 is disposed through the passageway 246 defined by a first washer of the plurality of washers 234, through a passageway defined by the main body 264 of the lug 250, through a passageway defined by the main body 256 of the terminal 248, through the first passageway 28 defined by the main body 12, through the passageway 246 defined by a second washer of the plurality of washers 234, and is threaded with the nut 232. The bolt 230 of the second fastener 216 is disposed through the passageway 246 defined by a third washer of the plurality of washers 234, through a passageway defined by the main body 264 of the lug 250, through a passageway defined by the main body 256 of the terminal 248, through the second passageway 30 defined by the main body 12, through the passageway 246 defined by a fourth washer of the plurality of washers 234, and is threaded with the nut 232. This configuration is considered advantageous at least because it provides direct contact between the main body 12 and the terminal 248 and between the terminal 248 and the lug 250.

While grounding system 210 is illustrated as including two fasteners 214, 216, a grounding system can include any suitable number of fasteners. Examples of numbers of fasteners considered suitable to include in a grounding system include one, at least one, two, a plurality, three, four, and any other number considered suitable for a particular embodiment. The number of fasteners included in a grounding system will depend on the number of passageways defined by a main body, the number of passageways defined by a terminal, and/or the number of passageways defined by a lug. While the first fastener 214 is illustrated as being the same as the second fastener 216, a first fastener included in a grounding system can be different than a second fastener included in the grounding system.

While the bolts 230, nuts 232, and washers 234 are illustrated as having a particular structural arrangement, a bolt, nut, and/or washer included in a grounding system can have any suitable shape, size, and configuration. The shape, size, and configuration of a fastener included in a grounding system will depend on various considerations, such as the thickness of a main body, terminal, and/or a lug, the configuration of the passageways defined by a main body, terminal, and/or a lug, and/or the structural configuration of the component or feature to which the grounding system is intended to be attached. Alternative embodiments of a fastener can omit the inclusion of a nut and/or washers. For example, if a main body of a grounding device, terminal, and/or a lug has a body that defines one or more passageways with internal threads, the fastener (e.g., bolt) included in a grounding system can define external threads that are sized and configured to mate with the internal threads defined by the main body of the grounding device, terminal, and/or lug such that the fastener can be releasably attached to the main body of the grounding device, terminal, and/or lug using the external and internal threads.

Any suitable material can be used to form a first fastener and/or a second fastener included in a grounding system and selection of a suitable material to form a fastener can be based on various considerations, including the material that forms a grounding device. Examples of materials considered suitable to form a fastener included in a grounding system include metals such as copper, stainless steel, titanium, metal alloys, conductive materials, and any other material considered suitable for a particular embodiment. In the illustrated embodiment, each component of the first fastener 214 and the second fastener 216 is formed of the same, conductive, material.

While the main body 12 has been illustrated as attached to the first side 252 of the terminal 248 such that the main body second surface 24 contacts the first side 252 of the terminal and the lug 250 has been illustrated as attached to the second side 254 of the terminal 248 such that the first side 260 of the lug 250 contacts the second side 254 of the terminal 248, a main body and lug can be attached to a terminal in any suitable configuration. Selection of a suitable configuration to attach a main body and a lug to a terminal can be based on various considerations, including the structural arrangement of a terminal to which the main body and/or lug are intended to be attached. Examples of configurations considered suitable to attach a main body of a grounding device and/or lug to a terminal include configurations in which a main body of a grounding device is attached to a first side of a terminal such that a main body second surface contacts a first side of the terminal and a lug is attached to a second side of the terminal such that a first side of the lug contacts the second side of the terminal, a main body of a grounding device is attached to a second side of a terminal such that a main body first surface contacts a second side of the terminal and a lug is attached to a first side of the terminal such that a second side of the lug contacts the first side of the terminal, a main body of a grounding device is attached to a first side of a terminal such that a main body second surface contacts a first side of the terminal and a lug is attached to the first side of the terminal such that a second side of the lug contacts the first side of the terminal, a main body of a grounding device is attached to a second side of a terminal such that a main body first surface contacts a second side of the terminal and a lug is attached to the second side of the terminal such that a first side of the lug contacts the second side of the terminal, such that only a main body of a grounding device is attached to a terminal, such that only a main body of a grounding device and a lug are attached to a terminal, combinations of the configurations described herein, and any other configuration considered suitable for a particular embodiment.

Figure 7:
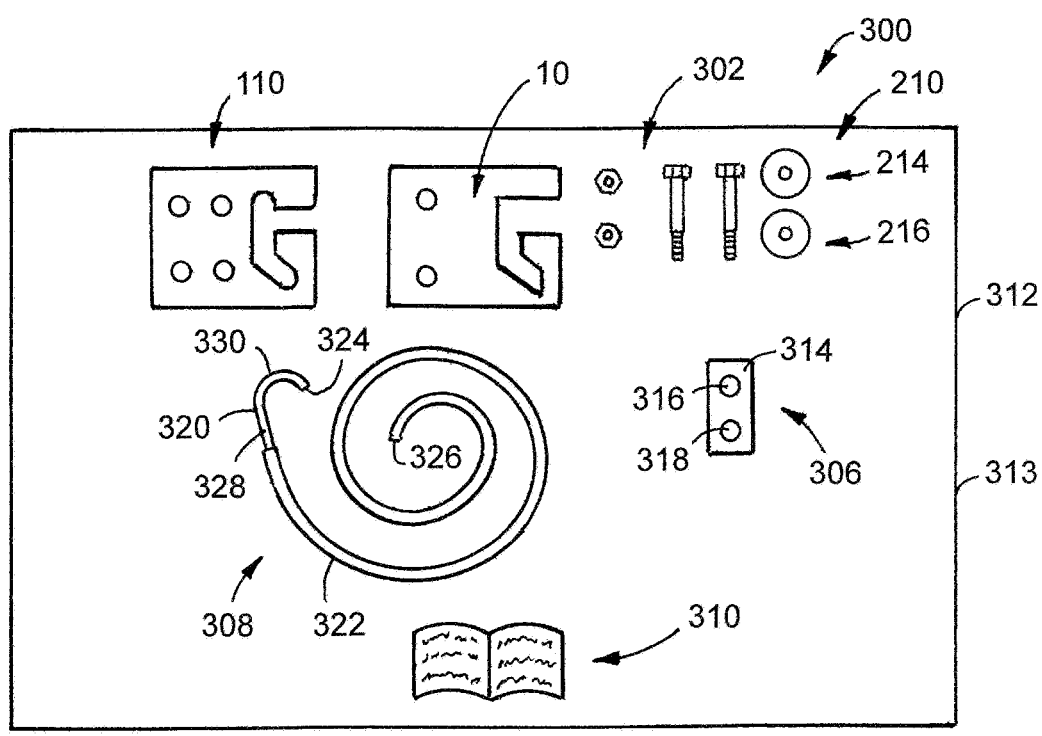
FIG. 7 is a top view of an example embodiment of a kit that includes a grounding system for grounding electrical equipment. The kit includes the grounding system illustrated in FIGS. 3, 4, 5, and 6.

FIG. 7 illustrates an example embodiment of a kit 300 that includes a grounding system for grounding electrical equipment. The kit 300 includes a grounding system 302 according to an embodiment; instructions for use 310; and a storage container 312.

Any suitable grounding system can be included in a kit and selection of a suitable grounding system to include in a kit can be based on various considerations, including the intended use of the kit. Examples of grounding systems considered suitable to include in a kit include grounding system 210, and any other grounding system according to an embodiment described herein. In the illustrated embodiment, kit 300 includes grounding system 210, as shown in FIGS. 3, 4, 5, and 6, that has a grounding device 110, as shown in FIG. 2, a first fastener 214, as shown in FIGS. 5 and 6, and a second fastener 216, as shown in FIGS. 5 and 6. Optional additional components that can be included in a kit are illustrated in FIG. 7, and include other grounding devices, such as grounding device 10; a spacer 306; and/or a grounding cable 308.

While kit 300 has been illustrated as including optional components, such as a grounding device 10, a spacer 306, and a grounding cable 308, a kit can include any suitable type of grounding device according to an embodiment described herein, spacer, and/or grounding cable and any suitable number of grounding systems, grounding devices, spacers, and/or grounding cables. Examples of numbers of grounding systems, grounding devices, spacers, and/or grounding cables considered suitable to include in a kit include one, at least one, two, a plurality, three, four, five, more than five, and any other number considered suitable for a particular embodiment. Examples of grounding devices considered suitable to include in a kit include grounding device 10, grounding device 110, grounding device 110', and any other grounding device according to an embodiment described herein. For example, a kit can omit the inclusion of a grounding device, a spacer, and/or a grounding cable and only include a grounding system, a grounding system and a grounding device, a grounding system and a grounding cable, instructions for use, and/or a container.

In the illustrated embodiment, the spacer 306 has a spacer main body 314 that defines a first passageway 316 and a second passageway 318. Each of the first passageway 316 and the second passageway 318 extends from a spacer first surface to a spacer second surface and is sized and configured to receive a portion of a fastener, as described in more detail herein. A spacer included in a kit can be formed of any suitable conductive material and selection of a suitable conductive material to form a spacer can be based on various considerations, including the material that forms the component to which a spacer is intended to be attached. Examples of conductive materials considered suitable to form a spacer include metals such as stainless steel, copper, conductive metal alloys, conductive materials, materials that have a rectangular, elongated, or square, cross-sectional configuration, combinations of the conductive materials described herein, and any other conductive material considered suitable for a particular embodiment. In the illustrated embodiment, the spacer 306 is formed of a conductive material, such as copper. The inclusion of a spacer 306 in a kit 300 is considered advantageous at least because the spacer 306 provides a mechanism for providing an operator with the ability to position the spacer 306 between a grounding device and a terminal, between a terminal and a lug, and/or between a grounding device and any other component, to avoid interference with other components disposed within a chamber defined by a cabinet.

While the spacer main body 314 has been illustrated as defining first and second passageways 316, 318, a spacer main body can define any suitable number of passageways and selection of a suitable number of passageways for a spacer main body to define can be based on various considerations, including the structural arrangement of the component to which a spacer is intended to be attached. Examples of numbers of passageways considered suitable for a spacer main body to define include one, at least one, two, a plurality, three, four, five, more than five, and any other number considered suitable for a particular embodiment.

In the illustrated embodiment, the grounding cable 308 has a wire 320 and a sheath 322. The wire 320 has a first end 324, a second end 326, and a main body 328 that defines a predefined curve 330. The curve 330 is defined between the first end 324 and the second end 326 of the wire 320 and near the first end 324 of the wire 320. The portion of the main body 328 of the wire 320 that defines the curve 330 is sized and configured to be received within a slot and a track defined by a grounding device, such as grounding device 10, grounding device 110, and/or grounding device 110'. The sheath 322 is disposed over a portion of the length of the wire 320. A wire included in a grounding cable can be formed of any suitable conductive material and a sheath included in a grounding cable can be formed of any suitable material. Selection of a suitable material to form a wire and a sheath can be based on various considerations, including the material that forms the component to which a wire is intended to contact during use. Examples of conductive materials considered suitable to form a wire include metals such as copper, steel, copper clad steel, conductive metal alloys, conductive materials, conductive malleable materials (e.g., materials that can be formed using human hands, hand tools), materials that have a round, rectangular, elongated, or square, cross-sectional configuration, combinations of the materials described herein, and any other material considered suitable for a particular embodiment. Examples of materials considered suitable to form a sheath include rubber, polymeric materials, polyvinyl chloride (PVC), polyethylene, non-conductive materials, combinations of the materials described herein, and any other material considered suitable for a particular embodiment. In the illustrated embodiment, the sheath 322 is formed of a first, non-conductive, material and the wire 320 is formed of a second, conductive, material that is different than the first material. The inclusion of a grounding cable 308 in a kit 300 is considered advantageous at least because it provides a mechanism for providing an operator with the ability to ground a portion, or the entirety, of electrical equipment prior to performing work, such as performing maintenance on the electrical equipment.

A wire included as part of a grounding cable can have any suitable structural arrangement and selection of a suitable structural arrangement for a wire can be based on various considerations, including the type of electrical equipment on which a grounding cable is intended to be used. Examples of structural arrangements considered suitable for a wire include wires that have a single strand, wires that have more than one strand, wires that have a plurality of strands that are disposed parallel to one another along a portion, or the entirety, of the length of the wire, wires that have a plurality of strands that are twisted or braided along a portion, or the entirety, of the length of the wire, wires that are flexible, rigid, a solid piece of material, cables, flexible cables, and any other structural arrangement considered suitable for a particular embodiment.

While the main body 328 of the wire 320 has been illustrated as defining a predefined curve 330, the main body of a wire can define any suitable configuration and selection of a suitable configuration for a wire to define can be based on various considerations, including the structural arrangement of a main body to which a grounding cable is intended to be attached. Examples of configurations considered suitable for a wire to define include those that are linear, define one or more predefined curves, those in which the wire defines an eye, or a through passageway, that facilitate releasable attachment to another device (e.g., grounding tool, hot stick, shotgun stick), and any other structural arrangement considered suitable for a particular embodiment. For example, if a wire defines a linear portion that extends from the first end toward the second end and if the wire member is formed of a malleable material that can be manipulated by using human hands, or hand tools, an operator can form a desired configuration (e.g., curve) along the portion of the wire member that extends from the first end toward the second end that is sized and configured to be disposed within a slot and/or a track defined by a grounding device.

A storage container included in a kit for grounding electrical equipment can have any suitable structural arrangement and be formed of any suitable material and selection of a suitable structural arrangement and material to form a storage container can be based on various considerations, including the number of grounding systems and/or grounding devices included in a kit. Examples of structural arrangements considered suitable to form a storage container include boxes, boxes that include a lid, boxes that include a lid attached to the box (e.g., pivotably attached), bags, and any other structural arrangement considered suitable for a particular embodiment. Examples of materials considered suitable to form a storage container include woods, metals, plastics, combinations of the materials described herein, and any other material considered suitable for a particular embodiment. In the illustrated embodiment, the storage container 312 is a box 313 formed of a rigid plastic.

Methods of installing a grounding system for grounding electrical equipment during an initial installation of the electrical equipment, methods of retrofitting a terminal of electrical equipment that is in service with a grounding system for grounding the electrical equipment, and methods of grounding electrical equipment are described herein. While the methods described herein are shown and described as series of acts, it is to be understood and appreciated that the methods are not limited by the order of acts described and illustrated, as some acts may in accordance with these methods, be omitted, be repeated, or occur in different orders and/or concurrently with other acts described herein. While some steps, optional steps, and/or alternative steps are exemplified by using a grounding device attached to a terminal that is in communication with a portion, or the entirety, of the electrical equipment, the methods, steps, optional steps, and/or alternative steps described herein can use any suitable grounding device according to an embodiment described herein attached to any suitable component of the electrical equipment or other electrically charged, or potentially electrically charged, component. Skilled artisans will be able to select a suitable structure on which to perform the methods, steps, optional steps, and/or alternative steps described herein based on various considerations, such as the type of component intended to be grounded.

Figure 8:
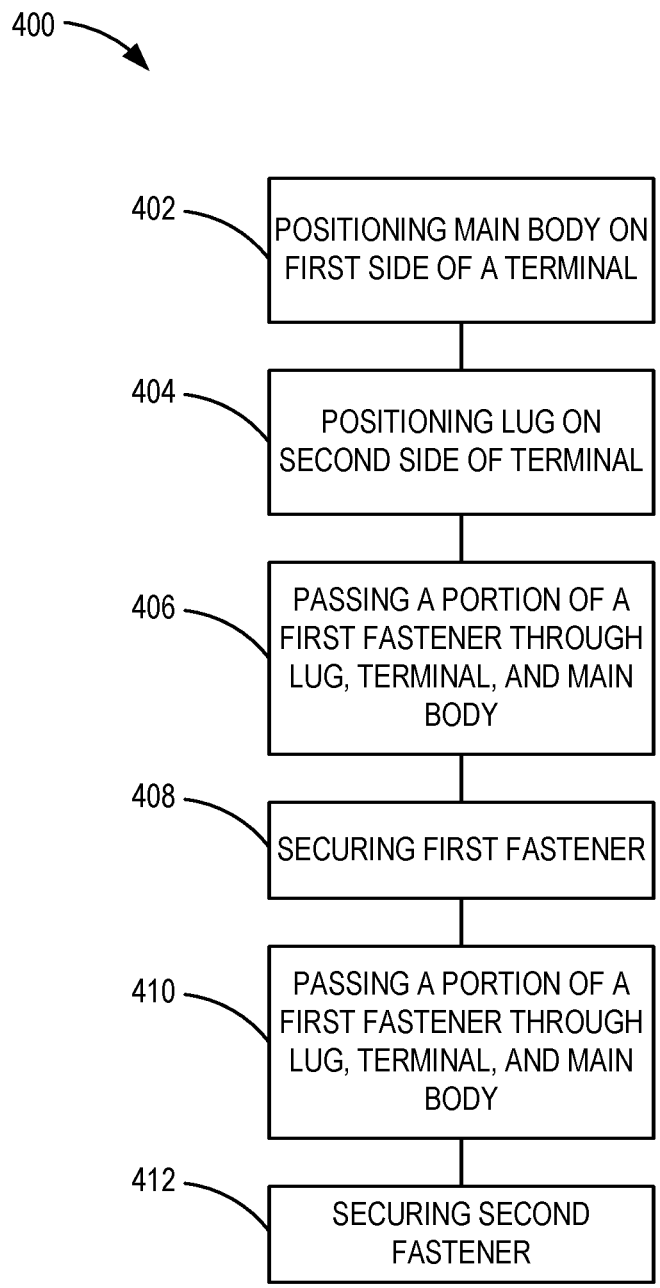
FIG. 8 is a schematic illustration of an example method of installing a grounding system for grounding electrical equipment during an initial installation of the electrical equipment.

FIG. 8 is a schematic illustration of an example method 400 of installing a grounding system for grounding electrical equipment during an initial installation of the electrical equipment. The methods described herein can be performed on any suitable type of electrical equipment and selection of suitable electrical equipment to perform the methods described herein can be based on various considerations, including the intended use of a grounding system and/or the structural arrangement of the electrical equipment. An example type of electrical equipment considered suitable to perform the methods described herein is a transformer.

A step 402 comprises positioning a main body of a grounding device on a first side of a terminal. Another step 404 comprises positioning a lug on a second side of the terminal. The second side of the terminal is opposably facing the first side of the terminal. Another step 406 comprises passing a portion of a first fastener through the lug, the terminal, and the main body of the grounding device. Another step 408 comprises securing the first fastener to the lug, the terminal, and the main body of the grounding device. Another step 410 comprises passing a portion of a second fastener through the lug, the terminal, and the main body of the grounding device. Another step 412 comprises securing the second fastener to the lug, the terminal, and the main body of the grounding device.

Method 400 can be accomplished using any suitable grounding system for grounding electrical equipment according to an embodiment described herein. Examples of grounding systems considered suitable to install include grounding system 210, variations of the grounding systems described herein, such as systems that include grounding device 10, grounding device 110, and/or grounding device 110', and any other grounding system according to an embodiment. An example grounding system that can be used to accomplish the methods, steps, optional steps, and/or alternative steps described herein is grounding system 210 and is illustrated and described with respect to FIGS. 3, 4, 5, and 6. The grounding system 210 includes a grounding device 110, a first fastener 214, and a second fastener 216.

Method 400 can be accomplished by attaching a grounding system to any suitable device, component, or feature of any suitable type of electrical equipment and selection of a suitable device, component, or feature of electrical equipment and of a suitable type of electrical equipment can be based on various considerations, including the intended use of the grounding system. Examples of devices, components, or features considered suitable to attach a grounding system include terminals that are housed in a transformer cabinet, and any other device, component, and/or feature considered suitable for a particular embodiment. Examples of types of electrical equipment considered suitable to attach a grounding system include transformers, and any other type of electrical equipment considered suitable for a particular embodiment. Method 400 has been described as being accomplished by installing a grounding system on a terminal of a transformer, such as terminal 248 as described with respect to FIGS. 3, 4, 5, and 6.

Step 402 can be accomplished by applying a force on any suitable portion of the main body of the grounding device directed toward the terminal such that a main body second surface contacts the first side of the terminal. Alternatively, step 402 can be accomplished by applying a force on any suitable portion of a main body of a grounding device directed toward a terminal such that a main body first surface contacts a second side of a terminal, by applying a force on any suitable portion of a main body of a grounding device directed toward a terminal such that a main body second surface contacts a spacer disposed between the main body and a first side of the terminal, or by applying a force on any suitable portion of a main body of a grounding device directed toward a terminal such that a main body first surface contacts a spacer disposed between the main body and a second side of the terminal.

Step 404 can be accomplished by applying a force on any suitable portion of the lug directed toward the terminal such that a first side of the lug contacts the second side of the terminal. Alternatively, step 404 can be accomplished by applying a force on any suitable portion of a lug directed toward a terminal such that a second side of the lug contacts a first side of the terminal, by applying a force on any suitable portion of a lug directed toward a terminal such that a first side of the lug contacts a spacer disposed between the lug and a second side of the terminal, or by applying a force on any suitable portion of a lug directed toward a terminal such that a second side of the lug contacts a spacer disposed between the lug and a first side of the terminal. Alternatively, step 404 can be omitted from method 400 in embodiments in which it is desired to only attach a main body to a terminal using a first fastener and/or a second fastener.

Step 406 can be accomplished by positioning a first bolt such that it is coaxial with a first passageway defined by the lug, a first passageway defined by the terminal, and a first passageway defined by the main body of the grounding device and applying a force on any suitable portion of the bolt directed through the passageways until the bolt is advanced through each of the passageways. Alternatively, step 406 can comprise passing a portion of a first fastener through a first washer, a lug, a terminal, a main body of a grounding device, and a second washer. This alternative step can be accomplished by positioning a first bolt such that it is coaxial with a passageway defined by a first washer, a first passageway defined by a lug, a first passageway defined by a terminal, a first passageway defined by a main body of a grounding device, a passageway defined by a second washer and applying a force on any suitable portion of the bolt directed through the passageways until the bolt is advanced through each of the passageways. Alternatively, step 406 can omit the inclusion of a lug and comprise passing a bolt of a first fastener through a main body of a grounding device and a terminal.

Step 408 can be accomplished by contacting a first nut with the first bolt and applying a rotational force on any suitable portion of the first nut while maintaining the position of the first bolt, or vice versa, such that the internal threads of the first nut mate with the external threads of the first bolt. As described herein, a fastener can comprise any suitable device or component capable of releasably attaching a main body of a grounding device and/or a spacer to a terminal and/or a lug. Therefore, steps 406 and 408 can be accomplished using alternative components or steps. For example, in embodiments in which one or more passageways defined by a main body of a grounding device and/or a spacer define internal threads, step 408 can alternatively be accomplished by applying a rotational force on any suitable portion of a first bolt such that internal threads defined by a main body of a grounding device and/or a spacer mate with external threads of the first bolt.

Step 410 can be accomplished by positioning a second bolt such that it is coaxial with a second passageway defined by the lug, a second passageway defined by the terminal, and a second passageway defined by the main body of the grounding device and applying a force on any suitable portion of the bolt directed through the passageways until the bolt is advanced through each of the passageways. Alternatively, step 410 can comprise passing a portion of a second fastener through a third washer, the lug, the terminal, the main body of the grounding device, and a fourth washer. This alternative step can be accomplished by positioning a second bolt such that it is coaxial with a passageway defined by a third washer, a second passageway defined by the lug, a second passageway defined by the terminal, a second passageway defined by the main body of the grounding device, a passageway defined by a fourth washer and applying a force on any suitable portion of the bolt directed through the passageways until the bolt is advanced through each of the passageways. Alternatively, step 410 can omit the inclusion of a lug and comprise passing a bolt of a second fastener through a main body of a grounding device and a terminal. Alternatively, step 410 can be omitted from method 400 in embodiments in which attachment between a main body of a grounding device, a terminal, and/or a lug can be accomplished using the first fastener.

Step 412 can be accomplished by contacting a second nut with the second bolt and applying a rotational force on any suitable portion of the second nut while maintaining the position of the second bolt, or vice versa, such that the internal threads of the second nut mate with the external threads of the second bolt. As described herein, a fastener can comprise any suitable device or component capable of releasably attaching a main body and/or a spacer to a terminal and/or a lug. Therefore, steps 410 and 412 can be accomplished using alternative components or steps. For example, in embodiments in which one or more of the passageways defined by a main body of a grounding device and/or a spacer define internal threads, step 412 can alternatively be accomplished by applying a rotational force on any suitable portion of a second bolt such that internal threads defined by a main body of a grounding device and/or a spacer mate with external threads of the bolt. Alternatively, step 412 can be omitted from method 400 in embodiments in which attachment between a main body of a grounding device, a terminal, and/or a lug can be accomplished using the first fastener.

An optional step that can be completed prior to step 402 comprises opening the doors to a cabinet. This optional step can be accomplished by applying a force on any suitable portion of each of the doors directed away from the body of the cabinet until the chamber of the cabinet is accessible. Another optional step that can be completed prior to step 402 comprises obtaining a grounding system for grounding electrical equipment. Another optional step that can be completed prior to step 402 comprises removing a locking mechanism that is releasably attached to doors of the cabinet.

Figure 9:
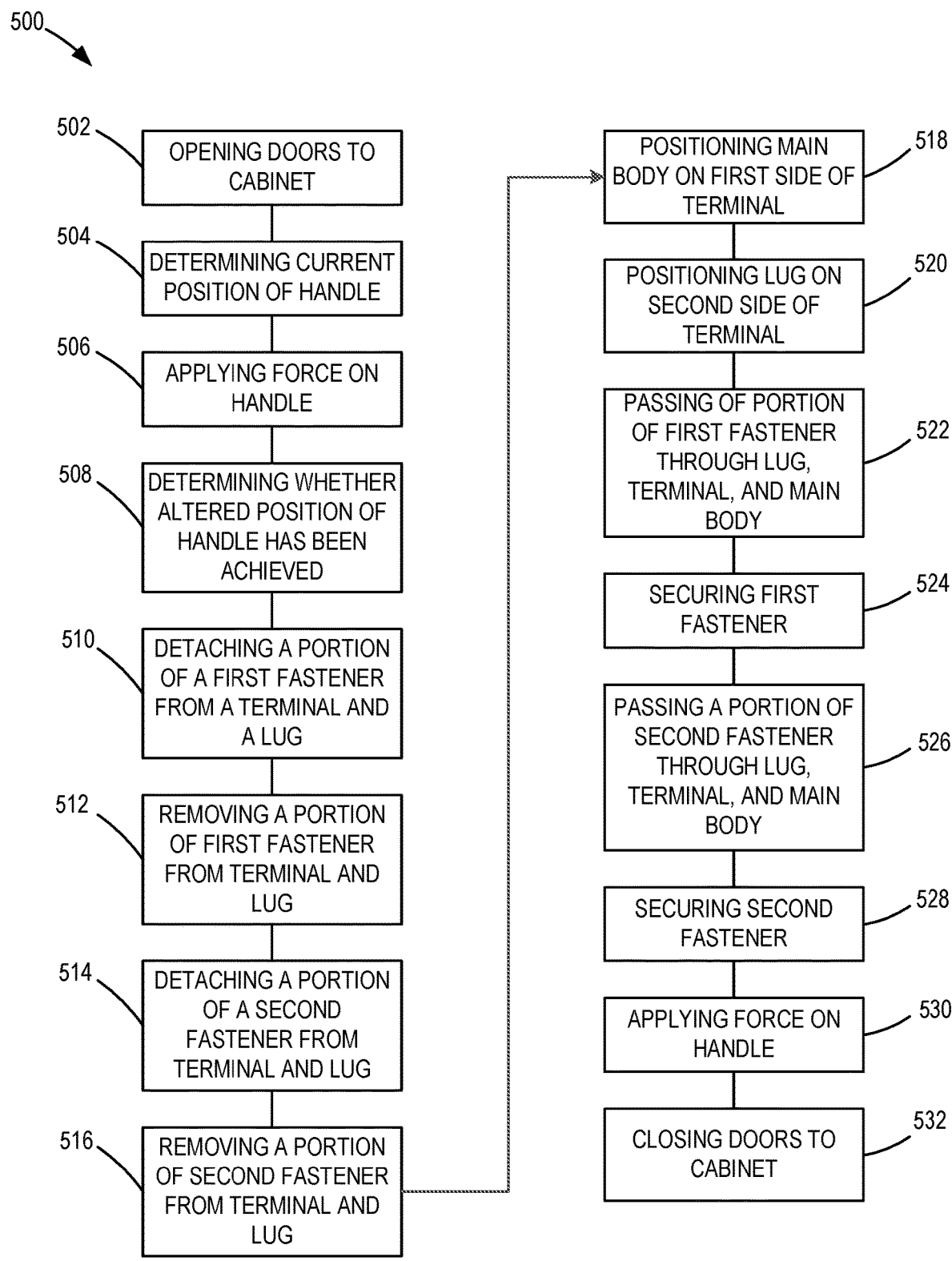
FIG. 9 is a schematic illustration of an example method of retrofitting a terminal of electrical equipment that is in service with a grounding system for grounding the electrical equipment.

FIG. 9 is a schematic illustration of an example method 500 of retrofitting a terminal of electrical equipment that is in service with a grounding system for grounding the electrical equipment.

A step 502 comprises opening the doors to a cabinet. Another step 504 comprises determining the current position of a handle of a switch of the electrical equipment. If manipulation of the switch is required, another step 506 comprises applying a force on the handle of the switch such that it moves from its original position to an altered position. Another step 508 comprises determining whether the altered position of the handle has been achieved. Another step 510 comprises detaching a portion of a first fastener from a terminal and a lug. Another step 512 comprises removing a portion of the first fastener from the terminal and the lug. Another step 514 comprises detaching a portion of a second fastener from the terminal and the lug. Another step 516 comprises removing a portion of the second fastener from the terminal and the lug. Another step 518 comprises positioning a main body of a grounding device on a first side of the terminal. Another step 520 comprises positioning the lug on a second side of the terminal. The second side of the terminal is opposably facing the first side of the terminal. Another step 522 comprises passing a portion of the first fastener through the lug, the terminal, and the main body of the grounding device. Another step 524 comprises securing the first fastener to the lug, the terminal, and the main body of the grounding device. Another step 526 comprises passing a portion of the second fastener through the lug, the terminal, and the main body of the grounding device. Another step 528 comprises securing the second fastener to the lug, the terminal, and the main body of the grounding device. Another step 530 comprises applying a force on the handle such that it moves from the altered position to its original position. Another step 532 comprises closing the doors to the cabinet.

Method 500 can be accomplished using any suitable grounding system for grounding electrical equipment according to an embodiment described herein. Examples of grounding systems considered suitable to retrofit on a terminal of electrical equipment include grounding system 210, variations of the grounding systems described herein, such as systems that include grounding device 10, grounding device 110, and/or grounding device 110', and any other grounding system according to an embodiment. An example grounding system that can be used to accomplish the methods, steps, optional steps, and/or alternative steps described herein is grounding system 210 and is illustrated and described with respect to FIGS. 3, 4, 5, and 6. The grounding system 210 includes a main body 112, a first fastener 214, and a second fastener 216.

Method 500 can be accomplished by attaching a grounding system to any suitable device, component, or feature of any suitable type of electrical equipment and selection of a suitable device, component, or feature of electrical equipment and of a suitable type of electrical equipment can be based on various considerations, including the intended use of the grounding system. Examples of devices, components, or features considered suitable to attach a grounding system include terminals that are housed in a transformer cabinet, and any other device, component, and/or feature considered suitable for a particular embodiment. Examples of types of electrical equipment considered suitable to attach a grounding system include transformers, and any other type of electrical equipment considered suitable for a particular embodiment. Method 500 has been described as being accomplished by retrofitting a grounding system on a terminal of a transformer, such as terminal 248 as described with respect to FIGS. 3, 4, 5, and 6.

Step 502 can be accomplished by applying a force on any suitable portion of each of the doors directed away from the body of the cabinet until the chamber of the cabinet is accessible. An optional step comprises removing a locking mechanism that is releasably attached to the doors of the cabinet.

Step 504 can be accomplished by visually identifying the handle of the switch and determining whether the handle is in a first position or a second position. Movement of the handle of the switch between the first position and the second position moves the switch between a closed state and an open state. When the handle is in the first position the switch is in the closed state and the transformer is in an energized state. When the handle is in the second position the switch is in the open state and the transformer is in a de-energized state. Alternatively, step 504 can be omitted from method 500 if movement of a handle is not desired.

Step 506 can be accomplished by applying a rotational force on any suitable portion of the handle of the switch until the handle moves from its original position to an altered position. For example, if it is desired to move the switch from a closed state to an open state, step 506 can be accomplished by applying a rotational force on any suitable portion of the handle of the switch until the handle moves from the first position to the second position. If manipulation of the switch is not required, step 506 can be omitted from method 500.

Step 508 can be accomplished by visually identifying the handle of the switch and determining whether the handle is in the first position or second position. Alternatively, step 508 can be omitted from method 500 if movement of a handle is not desired.

Step 510 can be accomplished by applying a rotational force on any suitable portion of a first nut of a first fastener while maintaining the position of a first bolt, or vice versa, until the first nut becomes free of the first bolt.

Step 512 can be accomplished by applying a force on any suitable portion of the first bolt directed away from the terminal until the first bolt is removed from a first passageway defined by the lug and a first passageway defined by the terminal. Alternatively, step 512 can comprise removing a portion of the first fastener from a first washer, the terminal, the lug, and a second washer. This alternative step can be accomplished by applying a force on any suitable portion of a first bolt directed away from the terminal until the first bolt is removed from a passageway defined by the first washer, a first passageway defined by the lug, a first passageway defined by the terminal, and a passageway defined by the second washer. As described herein, a fastener can comprise any suitable device or component capable of releasably attaching a main body and/or a spacer to a terminal and/or a lug. Therefore, steps 510 and 512 can be accomplished using alternative components or steps.

Step 514 can be accomplished by applying a rotational force on any suitable portion of a second nut of a second fastener while maintaining the position of a second bolt, or vice versa, until the second nut becomes free of the second bolt. Alternatively, step 514 can be omitted from method 500 in embodiments in which attachment between a terminal and a lug is accomplished using a first fastener.

Step 516 can be accomplished by applying a force on any suitable portion of the second bolt directed away from the terminal until the second bolt is removed from a second passageway defined by the lug and a second passageway defined by the terminal. Alternatively, step 516 can comprise removing a portion of the second fastener from a third washer, the terminal, the lug, and a fourth washer. This alternative step can be accomplished by applying a force on any suitable portion of a second bolt directed away from the terminal until the second bolt is removed from a passageway defined by the third washer, a second passageway defined by the lug, a second passageway defined by the terminal, and a passageway defined by the fourth washer. Alternatively, step 516 can be omitted from method 500 in embodiments in which attachment between a terminal and a lug is accomplished using a first fastener. As described herein, a fastener can comprise any suitable device or component capable of releasably attaching a main body and/or a spacer to a terminal and/or a lug. Therefore, steps 514 and 516 can be accomplished using alternative components or steps.

Step 518 can be accomplished as described above with respect to step 402. An optional step that can be accomplished prior to step 518 comprises obtaining a grounding system, such as those described herein. Step 520 can be accomplished as described above with respect to step 404. Step 522 can be accomplished as described above with respect to step 406. Step 524 can be accomplished as described above with respect to step 408. Step 526 can be accomplished as described above with respect to step 410. Step 528 can be accomplished as described above with respect to step 412.

Step 530 can be accomplished by applying a rotational force on any suitable portion of the handle of the switch until the handle moves from its altered position to its original position. For example, if it is desired to move the switch from an open state to a closed state, step 530 can be accomplished by applying a rotational force on any suitable portion of the handle of the switch until the handle moves from the second position to the first position. Alternatively, if manipulation of the switch was not required in step 506, step 530 can be accomplished by applying a rotational force on any suitable portion of the handle of the switch until the handle moves from its original position to an altered position. Alternatively, step 530 can be omitted from method 500 in embodiments in which it is not desired to move the handle between its first and second positions.

Step 532 can be accomplished by applying a force on any suitable portion of each of the doors directed toward the body of the cabinet until the chamber of the cabinet is not accessible. An optional step comprises releasably attaching a locking mechanism to the doors of the cabinet.

In embodiments in which it is desired to attach a grounding device to more than one terminal of a transformer, or other type of equipment, any, or all, of the steps described above with respect to method 400 and/or method 500 can be repeated on each terminal of the transformer, or equipment, or more than one terminal or the transformer, or equipment.

While a particular arrangement between a lug, a grounding device, and a terminal have been described above with respect to method 400 and method 500, the methods described herein can include any suitable arrangement between a lug, a grounding device, and a terminal. Selection of a suitable arrangement between a lug, a grounding device, and a terminal can be based on various considerations, including the number of lugs included on a transformer and/or the number of passageways defined by a terminal. Examples of arrangements considered suitable between a lug, a grounding device, and a terminal include those in which only a grounding device is connected to a terminal, those in which only a grounding device is attached to one or more passageways defined by a terminal, those in which a lug is attached to a first side of a terminal and a grounding device is attached to a second side of a terminal that is opposably facing the first side, those in which a lug and a grounding device are attached to a terminal and the grounding device is disposed between the lug and the terminal, those in which a lug and a grounding device are attached to a terminal and the lug is disposed between the grounding device and the terminal, those in which a first lug, a second leg, and a grounding device are attached to a terminal such that the first lug is disposed on a first side of the terminal and a second lug is disposed on the second side of a terminal and the grounding device is disposed between the first lug and the terminal, between the second lug and the terminal, the first lug is disposed between the grounding device and the terminal, or the second lug is disposed between the grounding device and the terminal, those in which a first lug, a second lug, and a grounding device are attached to a terminal and the first lug and the second lug are disposed between the grounding device and the terminal, the grounding device and the second lug are disposed between the first lug and the terminal, or the grounding device and the first lug are disposed between the second lug and the terminal, and/or any other arrangement considered suitable for a particular embodiment.

Figure 10:
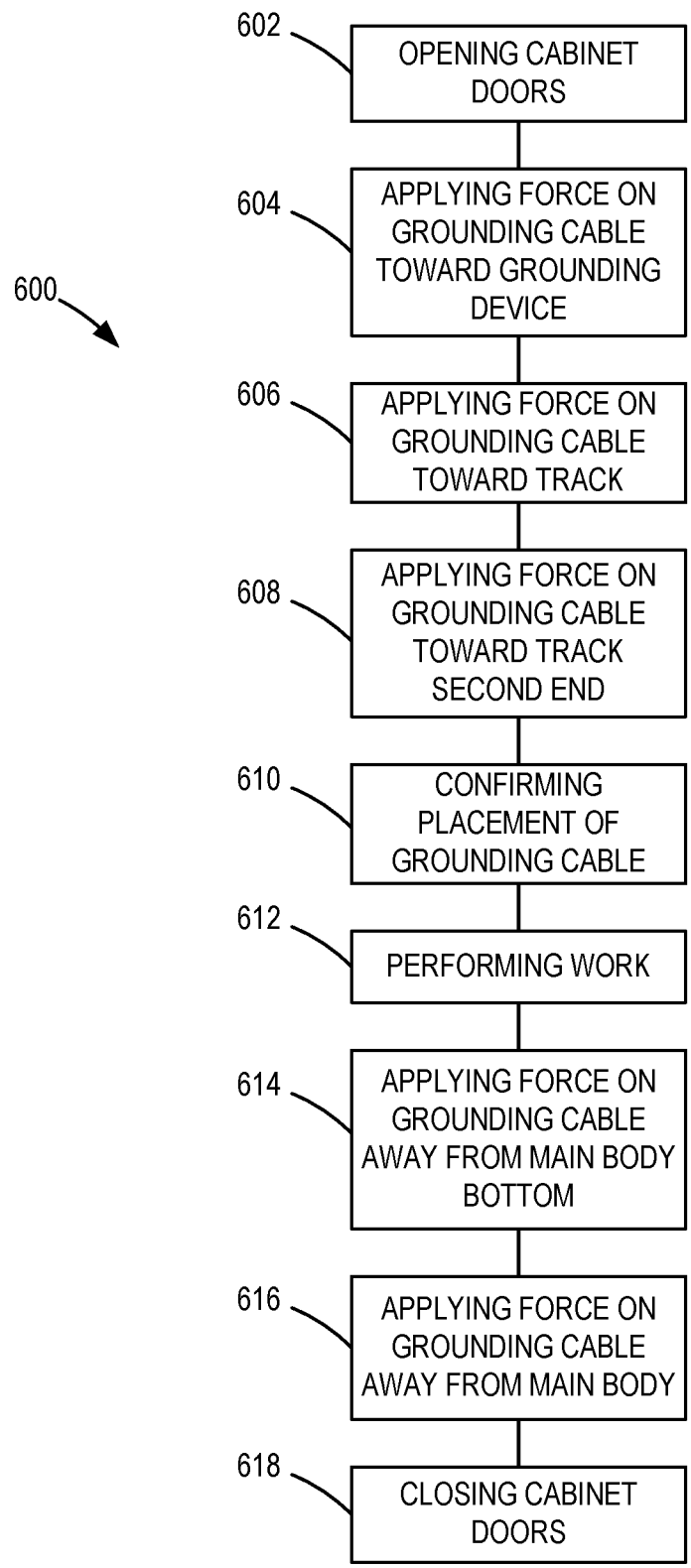
FIG. 10 is a schematic illustration of an example method of grounding electrical equipment.

FIG. 10 is a schematic illustration of an example method 600 of grounding electrical equipment.

A step 602 comprises opening the doors to the cabinet. Another step 604 comprises applying a force on a grounding cable that is directed toward a grounding device that has a main body until the grounding cable is disposed within a slot defined by the main body of the grounding device. Another step 606 comprises applying a force on the grounding cable directed toward a track defined by the main body of the grounding device until the grounding cable is disposed within the track. Another step 608 comprises applying a force on the grounding cable directed toward the track second end until the grounding cable is disposed adjacent the track second end. Another step 610 comprises confirming placement of the grounding cable relative to the main body of the grounding device. Another step 612 comprises performing work. Another step 614 comprises applying a force on the grounding cable directed away from a main body bottom until the grounding cable is disposed adjacent the slot defined by the main body. Another step 616 comprises applying a force on the grounding cable directed away from the main body of the grounding device until the grounding cable is free of the main body of the grounding device. Another step 618 comprises closing the doors to the cabinet.

Method 600 can be accomplished using a grounding system that is attached to any suitable device, component, or feature of any suitable type of electrical equipment and selection of a suitable device, component, or feature of electrical equipment and of a suitable type of electrical equipment can be based on various considerations, including the intended use of the grounding system. Examples of devices, components, or features considered suitable to perform the steps, optional steps, and/or alternative steps described herein include terminals that are housed in a transformer cabinet, and any other device, component, and/or feature considered suitable for a particular embodiment. Examples of types of electrical equipment considered suitable to perform the steps, optional steps, and/or alternative steps described herein include transformers, and any other type of electrical equipment considered suitable for a particular embodiment. Method 600 has been described as being accomplished by grounding a terminal of a transformer, such as terminal 248 as described with respect to FIGS. 3, 4, 5, and 6, that has a grounding system attached to the terminal. Any suitable grounding system for grounding electrical equipment according to an embodiment described herein can be attached to a terminal to accomplish the steps, optional steps, and/or alternative steps described herein. Examples of grounding systems considered suitable include grounding system 210, variations of the grounding systems described herein, such as systems that include grounding device 10, grounding device 110, and/or grounding device 110', and any other grounding system according to an embodiment. Method 600 has been described as being accomplished using a grounding system 210 that includes a main body 112, as illustrated in FIG. 2, a first fastener 214, as described in FIGS. 3, 4, 5, and 6, and a second fastener 216, as described in FIGS. 3, 4, 5, and 6.

Step 602 can be accomplished by applying a force on any suitable portion of each of the doors directed away from the body of the cabinet until the chamber of the cabinet is accessible. An optional step comprises removing a locking mechanism that is releasably attached to the doors of the cabinet.

Figure 11:
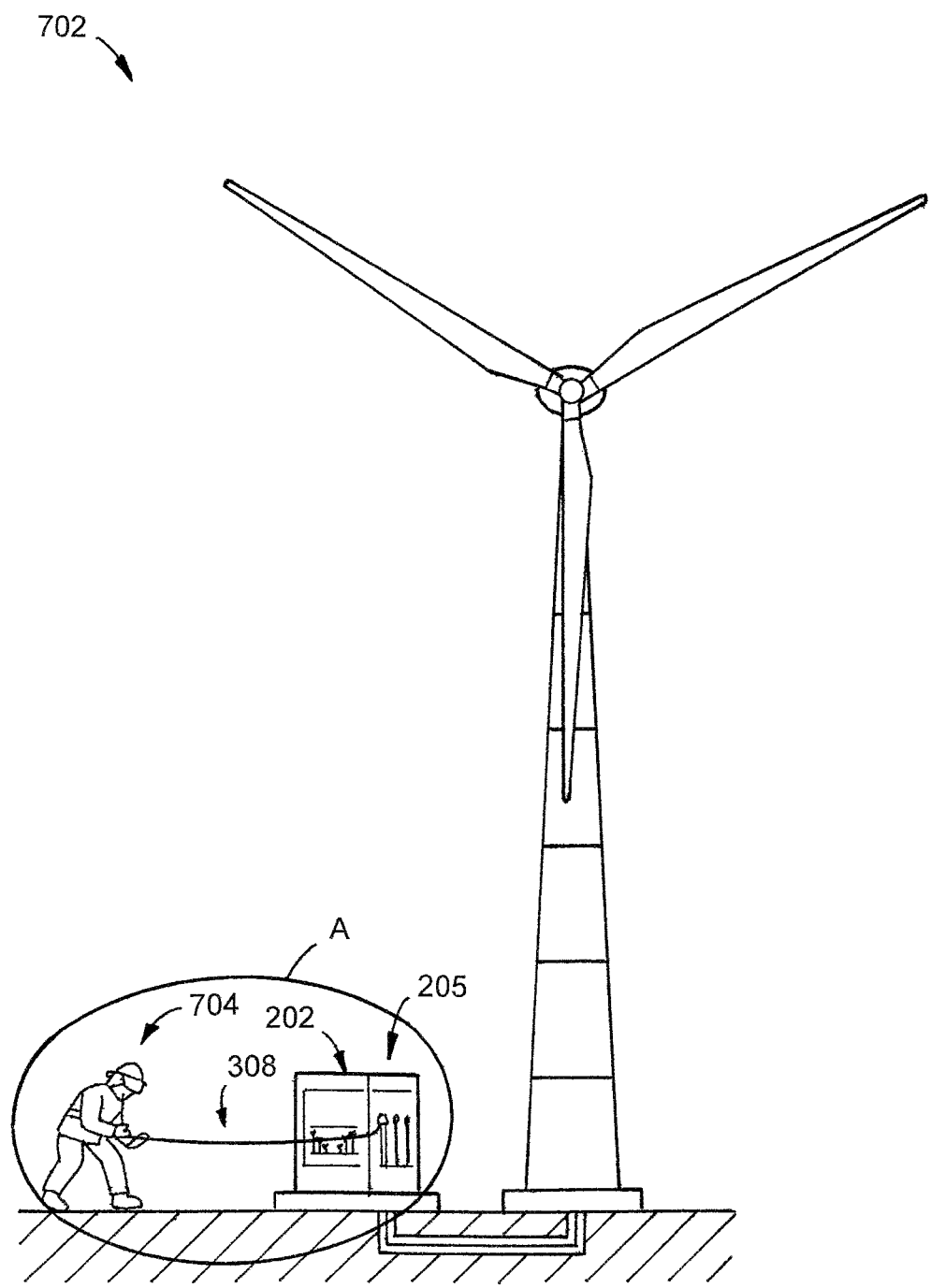
FIG. 11 is an elevation view of an operator grounding a portion of a transformer connected to a wind turbine using an example embodiment of a grounding system for grounding electrical equipment.

Step 604 can be accomplished by applying a force on any suitable portion of a grounding cable that is directed toward a grounding device that has a main body until the grounding cable passes through a slot and is disposed within the slot. For example, FIG. 11 illustrates a wind turbine 702 in communication with a transformer 205 housed within cabinet 202. FIG. 11 illustrates wind turbine 702 in an off state. FIG. 11 also illustrates an operator 704 applying a force on any suitable portion of a grounding cable 308 such that the grounding cable 308 passes through the slot and is disposed within the slot defined by the main body.

Step 606 can be accomplished by applying a force on any suitable portion of the grounding cable directed toward the track until the grounding cable is disposed within the track.

Figure 12:
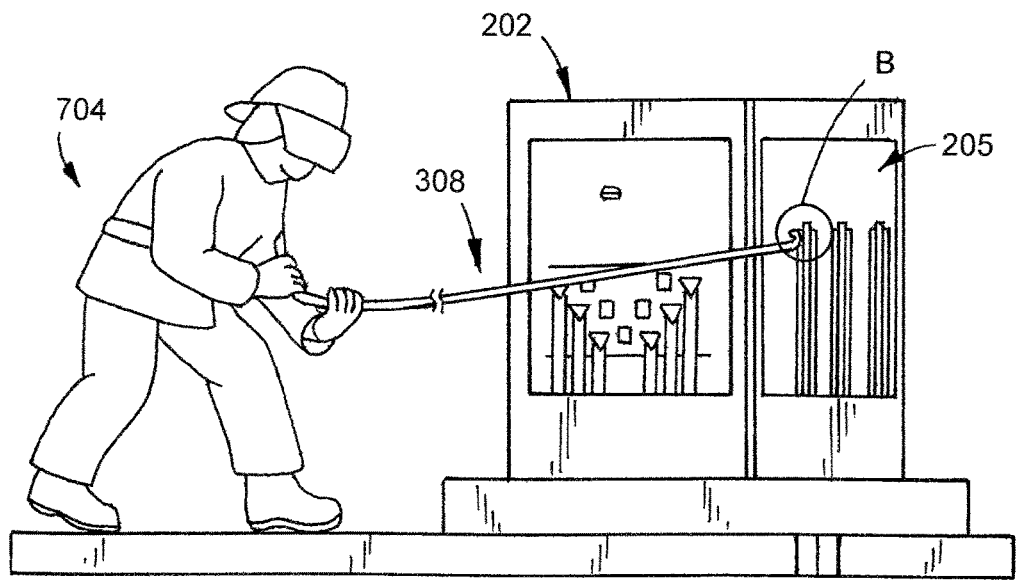
FIG. 12 is magnified view of area A illustrated in FIG. 11.
Figure 13:
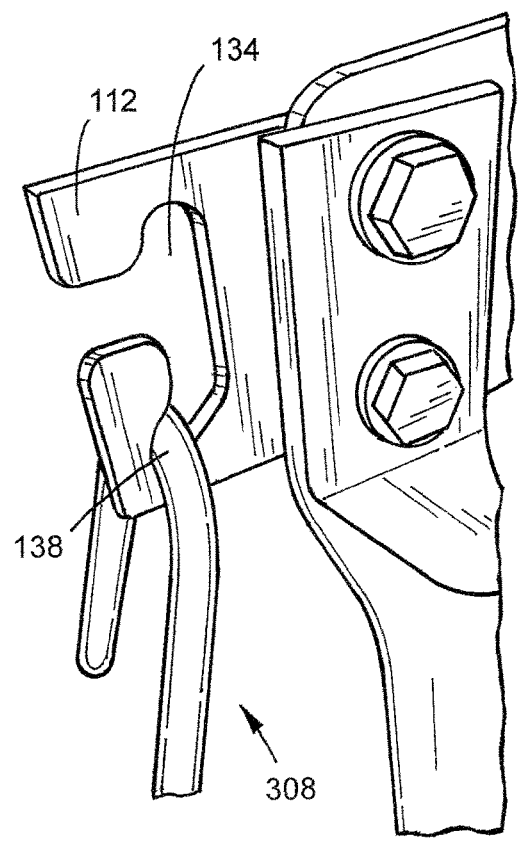
FIG. 13 is a magnified view of area B illustrated in FIG. 12.

Step 608 can be accomplished by applying a force on any suitable portion of the grounding cable directed toward the track second end until the grounding cable is disposed adjacent the track second end (e.g., is contacting the track second end). For example, FIGS. 12 and 13 illustrate the operator 704 applying a force on any suitable portion of the grounding cable 308 directed toward the track second end 138 until the grounding cable 308 advances through the track 134 and is disposed adjacent the track second end 138.

An optional step that can be included in method 600 comprises obtaining a grounding tool, such as a hot stick or shotgun stick. The grounding tool comprises a rigid elongate member that can be releasably attached to a grounding cable. For example, a hot stick includes a rigid hook on an end of a rigid elongate member that can be utilized to releasably attach a grounding cable to the elongate member and manipulate the grounding cable. Alternatively, a shotgun stick includes an operable hook on an end of a rigid elongate member that can be utilized to releasably attach (e.g., clamp onto) a grounding cable to the elongate member and manipulate the grounding cable. Another optional step comprises releasably attaching the grounding tool to the grounding cable. Another optional step that can be completed alternative to step 604 comprises applying a force on the grounding tool, that is directed toward a grounding device that has a main body until the grounding cable is disposed within a slot defined by the main body of the grounding device. This optional step can be accomplished by applying a force on any suitable portion of the grounding tool that is directed toward a grounding device that has a main body until the grounding cable passes through a slot and is disposed within the slot. Another optional step that can be completed alternative to step 606 comprises applying a force on the grounding tool, directed toward a track defined by the main body of the grounding device until the grounding cable is disposed within the track. This optional step can be accomplished by applying a force on any suitable portion of the grounding tool, directed toward the track until the grounding cable is disposed within the track. Another optional step that can be completed alternative to step 608 comprises applying a force on the grounding tool, directed toward the track second end until the grounding cable is disposed adjacent the track second end. This optional step can be accomplished by applying a force on any suitable portion of the grounding tool, directed toward the track second end until the grounding cable is disposed adjacent the track second end (e.g., is contacting the track second end).

Step 610 can be accomplished by visually identifying the grounding cable and determining whether the grounding cable is disposed in the track and adjacent the track second end. If the grounding cable is disposed adjacent the track second end, steps 612, 614, and 616 can be completed. If the grounding cable is not positioned adjacent the track second end, an optional step that can be completed prior to steps 612, 614, and 616 comprises adjusting the position of the grounding cable and can be accomplished by applying a force on any suitable portion of a grounding cable, grounding tool, such as a hot stick, or shotgun stick, directed toward the track second end until the grounding cable is disposed adjacent the track second end.

Another step that can be included in method 600 comprises grounding the second end of the grounding cable. This step can be accomplished prior to step 612, step 610, step 608, step 606, step 604, and/or step 602. This step can be accomplished using any suitable technique or method of grounding the second end of a grounding cable and selection of a suitable technique or method can be based on various considerations, including the type of work intended to be performed. Examples of techniques and methods of grounding the second end of a grounding cable considered suitable include attaching the second end of a grounding cable to a grounded terminal, attaching (e.g., using a clamp attached to the second end of the grounding cable) the second end of a grounding cable to a ground terminal of a transformer, attaching the second end of a grounding cable to a grounded terminal of a component separate from a transformer on which a grounding device is being attached, and any other technique or method considered suitable for a particular embodiment.

In embodiments in which it is desired to ground more than one terminal of a transformer, or other type of equipment, any, or all, of the steps described above with respect to method 600 (e.g., step 604, step 606, step 608, step 610) can be repeated on each terminal of the transformer, or equipment, or more than one terminal or the transformer, or equipment utilizing a separate grounding cable, that is attached to, or free of, the other grounding cable(s), and a separate grounding device.

Step 612 can be accomplished based on the procedure intended to be completed on the electrical equipment. For example, step 612 can be accomplished based on the procedure intended to be completed on a transformer, a switch, a terminal, a wind turbine, and/or a device, component, or system that is in communication with the transformer and can comprise performing work on a transformer housed within a cabinet, a switch, and/or performing work on a wind turbine.

Step 614 can be accomplished by applying a force on any suitable portion of a grounding cable directed away from the main body of the grounding device bottom until the grounding cable is disposed adjacent the slot defined by the main body of the grounding device.

Step 616 can be accomplished by applying a force on any suitable portion of a grounding cable that is directed away from the grounding device such that the grounding cable passes through the slot and is free of the grounding device.

Step 618 can be accomplished as described above with respect to step 532.

It is considered advantageous to utilize a grounding cable and a grounding tool, as described herein at least because it provides a mechanism for grounding a portion, or the entirety, of a piece of equipment, such as a transformer, from a safe distance from the equipment without a user having to directly contact the equipment or utilize devices that are difficult to manipulate.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and any and all equivalents thereof.

What is claimed is:

1. A grounding device for grounding electrical equipment, the grounding device comprising:
   a main body having a main body first end, a main body second end, a main body top, a main body bottom, a main body first surface, a main body second surface, and defining a first passageway, a slot, and a track, the first passageway extending from the main body first surface to the main body second surface, the slot extending into the main body from the main body second end toward the main body first end to the track, the slot extending from the main body first surface to the main body second surface, the track having a track first end, a track second end, a track first portion, and a track second portion, the track in communication with the slot, disposed between the first passageway and the main body second end, and extending from the main body first surface to the main body second surface, the track first portion extending from the slot and away from the main body top, the track second portion extending from the track first portion, away from the main body first end, and away from the main body top to the track second end.

2. The grounding device of claim 1, wherein the main body has a main body lengthwise axis that extends through the main body first end and the main body second end;
   wherein the track first portion has a track first portion lengthwise axis disposed at a first angle relative to the main body lengthwise axis; and
   wherein the track second portion has a track second portion lengthwise axis disposed at a second angle relative to the track first portion lengthwise axis, the second angle being different than the first angle.

3. The grounding device of claim 2, wherein the second angle is greater than the first angle.

4. The grounding device of claim 1, wherein the main body is formed of a conductive material.

5. The grounding device of claim 4, wherein the main body is formed of copper.

6. The grounding device of claim 1, wherein the main body has a main body lengthwise axis that extends through the main body first end and the main body second end;
   wherein the main body has a main body length that is measured along the main body lengthwise axis and that extends from the main body first end to the main body second end;
   wherein the slot has a slot lengthwise axis and a slot length that is measured along the slot lengthwise axis; and
   wherein the slot length is less than one half of the main body length.

7. The grounding device of claim 6, wherein the track first portion has a track first portion lengthwise axis disposed at a first angle relative to the main body lengthwise axis and a track first portion length that is measured along the track first portion lengthwise axis; and
   wherein the track first portion length is greater than the slot length.

8. The grounding device of claim 1, wherein the slot has a slot lengthwise axis and a slot length measured along the slot lengthwise axis; and
   wherein the track second end is disposed a distance from the main body second end that is less than the slot length.

9. The grounding device of claim 1, wherein the main body defines a second passageway disposed between the main body first end and the track.

10. The grounding device of claim 1, wherein the track has a track third portion extending from the track first end, away from the main body top, to the track first portion.

11. A kit comprising:
a grounding device for grounding electrical equipment, the grounding device comprising:
  a main body having a main body first end, a main body second end, a main body top, a main body bottom, a main body first surface, a main body second surface, and defining a first passageway, a slot, and a track, the first passageway extending from the main body first surface to the main body second surface, the slot extending into the main body from the main body second end toward the main body first end to the track, the slot extending from the main body first surface to the main body second surface, the track having a track first end, a track second end, a track first portion, and a track second portion, the track in communication with the slot, disposed between the first passageway and the main body second end, and extending from the main body first surface to the main body second surface, the track first portion extending from the slot and away from the main body top, the track second portion extending from the track first portion, away from the main body first end, and away from the main body top to the track second end;
  a first fastener sized and configured to be partially disposed within the first passageway; and
  a grounding cable sized and configured to be received with the slot and the track defined by the main body and moveable relative to the main body within the slot and the track.

12. The kit of claim 11, wherein the main body has a main body lengthwise axis that extends through the main body first end and the main body second end;
  wherein the track first portion has a track first portion lengthwise axis disposed at a first angle relative to the main body lengthwise axis; and
  wherein the track second portion has a track second portion lengthwise axis disposed at a second angle relative to the track first portion lengthwise axis, the second angle being different than the first angle.

13. The kit of claim 12, wherein the second angle is greater than the first angle.

14. The kit of claim 11, wherein the main body is formed of a conductive material.

15. The kit of claim 14, wherein the main body is formed of copper.

16. The kit of claim 11, wherein the main body has a main body lengthwise axis that extends through the main body first end and the main body second end;
  wherein the main body has a main body length that is measured along the main body lengthwise axis and that extends from the main body first end to the main body second end;
  wherein the slot has a slot lengthwise axis and a slot length that is measured along the slot lengthwise axis; and
  wherein the slot length is less than one half of the main body length.

17. The kit of claim 16, wherein the track first portion has a track first portion lengthwise axis disposed at a first angle relative to the main body lengthwise axis and a track first portion length that is measured along the track lengthwise axis; and
  wherein the track first portion length is greater than the slot length.

18. The kit of claim 11, wherein the slot has a slot lengthwise axis and a slot length that is measured along the slot lengthwise axis; and
  wherein the track second end is disposed a distance from the main body second end that is less than the slot length.

19. The kit of claim 11, wherein the track has a track third portion extending from the track first end, away from the main body top, to the track first portion.

20. A method of installing a grounding system for grounding electrical equipment, the electrical equipment having a terminal having a first side, a second side, and defining a passageway, the method comprising the steps of:
obtaining a grounding system for grounding said electrical equipment, the grounding system comprising:
  a main body having a main body first end, a main body second end, a main body top, a main body bottom, a main body first surface, a main body second surface, and defining a first passageway, a slot, and a track, the first passageway extending from the main body first surface to the main body second surface, the slot extending into the main body from the main body second end toward the main body first end to the track, the slot extending from the main body first surface to the main body second surface, the track having a track first end, a track second end, a track first portion, and a track second portion, the track in communication with the slot, disposed between the first passageway and the main body second end, and extending from the main body first surface to the main body second surface, the track first portion extending from the slot and away from the main body top, the track second portion extending from the track first portion, away from the main body first end, and away from the main body top to the track second end; and
  a first fastener sized and configured to be partially disposed within the first passageway and said passageway defined by said terminal;
positioning the main body on said first side of said terminal;
passing a portion of the first fastener through the first passageway defined by the main body and said passageway defined by said terminal; and
securing the first fastener to the main body and said terminal.

* * * * *